(12) United States Patent
Sengoku

(10) Patent No.: US 9,710,410 B2
(45) Date of Patent: Jul. 18, 2017

(54) CAMERA CONTROL SLAVE DEVICES WITH MULTIPLE SLAVE DEVICE IDENTIFIERS

(71) Applicant: QUALCOMM Incorporated, San Diego, CA (US)

(72) Inventor: Shoichiro Sengoku, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 14/520,180

(22) Filed: Oct. 21, 2014

(65) Prior Publication Data

US 2015/0120975 A1    Apr. 30, 2015

Related U.S. Application Data

(60) Provisional application No. 61/898,138, filed on Oct. 31, 2013.

(51) Int. Cl.
| | | |
|---|---|---|
| *G06F 13/42* | (2006.01) | |
| *G06F 13/362* | (2006.01) | |
| *G06F 13/40* | (2006.01) | |
| *G06F 13/36* | (2006.01) | |

(52) U.S. Cl.
CPC ............ *G06F 13/362* (2013.01); *G06F 13/40* (2013.01); *G06F 13/4282* (2013.01)

(58) Field of Classification Search
CPC .............................. G06F 13/4282; G06F 13/36

USPC .................................................. 710/110, 305
See application file for complete search history.

(56) References Cited

U.S. PATENT DOCUMENTS

| | | | |
|---|---|---|---|
| 2004/0037303 A1 | 2/2004 | Joshi et al. | |
| 2005/0046740 A1* | 3/2005 | Davis ................... | H04N 5/2254 348/373 |
| 2011/0302344 A1* | 12/2011 | Bell ..................... | G06F 13/4291 710/110 |
| 2014/0320608 A1* | 10/2014 | Muukki .............. | G06F 13/4282 348/47 |

OTHER PUBLICATIONS

International Search Report and Written Opinion—PCT/US2014/061826—ISA/EPO—Jan. 20, 2015.

(Continued)

*Primary Examiner* — Christopher Shin
(74) *Attorney, Agent, or Firm* — Loza & Loza LLP

(57) ABSTRACT

System, methods and apparatus are described that facilitate transmission of data, particularly between two devices within an electronic apparatus. An address list may associate each of a plurality of slave devices coupled to a control data bus with a plurality of slave device identifiers. Access to the control data bus may be controlled based on the address list such that, in a first mode of operation information may be broadcast to multiple slave devices using a first group slave device identifier and, in a second mode of operation, information may be exchanged with a single slave device using an individualized slave device identifier.

30 Claims, 19 Drawing Sheets

(56) References Cited

OTHER PUBLICATIONS

Mahendra., P., "I 2 C over DS90UB913/4 FPD-Link III with Bidirectional Control Channel", Application Report SNLA222, May 31, 2013 (May 31, 2013), XP055160568, Retrieved from the Internet: URL:http://www.ti.com/lit/an/snla222/snla222.pdf [retrieved on Jan. 8, 2015], the whole document.
Philips Semiconductors Ed—Philips Semiconductors: "The I²C bus specification, version 2.1", Internet Citation,Jan. 2000 (Jan. 2006), pp. 1-46, XP002678058, Retrieved from the Internet: URL: http://i2c2p. twibright.com:8088/spec/i2c.pdf [retrieved on Jun. 19, 2012].

* cited by examiner

CAMERA CONTROL SLAVE DEVICES WITH MULTIPLE SLAVE DEVICE IDENTIFIERS

CROSS-REFERENCE TO RELATED APPLICATIONS

The present Application for patent claims priority to Provisional Application No. App. No. 61/898,138, entitled "Camera Control Slave Devices With Multiple Slave Device Identifiers" filed Oct. 31, 2013, which is assigned to the assignee hereof and hereby expressly incorporated by reference herein.

FIELD

The present disclosure pertains to enabling operations over a shared bus and, more particularly, to transmitting multiple slave device identifications over a control data bus to a single slave device identified with multiple slave device identifiers.

BACKGROUND

The Inter-Integrated Circuit serial bus, which may also be referred to as the I2C bus or the I²C bus, is a serial single-ended computer bus that was intended for use in connecting low-speed peripherals to a processor. The I2C bus is a multi-master bus in which each device can serve as a master and a slave for different messages transmitted on the I2C bus. The I2C bus can transmit data using only two bidirectional open-drain connectors, including a Serial Data Line (SDA) and a Serial Clock Line (SCL). The connectors typically include signal wires that are terminated by pull-up resistors.

Protocols governing I2C bus operations define basic types of messages, each of which begins with a START and ends with a STOP. The I2C bus uses 7-bit addressing and defines two types of nodes. A master node is a node that generates the clock and initiates communication with slave nodes. A slave node is a node that receives the clock and responds when addressed by the master. The I2C bus is a multi-master bus, which means any number of master nodes can be present. Additionally, master and slave roles may be changed between messages (i.e., after a STOP is sent).

In the context of a camera implementation, unidirectional transmissions may be used to capture an image from a sensor and transmit image data to memory in a baseband processor, while control data may be exchanged between the baseband processor and the sensor as well as other peripheral devices. In one example, a Camera Control Interface (CCI) protocol may be used for such control data between the baseband processor and the image sensor (and/or one or more slave nodes). In one example, the CCI protocol may be implemented over an I2C serial bus between the image sensor and the baseband processor.

Collisions may occur when, for example, two or more identical slave devices are coupled to the same bus, and/or two or more slave devices coupled to the same bus are provided with the same slave device identifier (SID). In one example, a manufacturer may pre-program slave device products with the same SID. In a conventional CCI bus system, data collision issues can arise when slave devices are configured with the same SID.

Therefore, it is desirable to find ways to use multiple slave devices configured with the same SID on a single bus without causing data collisions.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In certain aspects of the invention, a device includes a control data bus, a master device coupled to the control data bus and configured to control access to the control data bus, a first slave device that is configured with a first slave device identifier and a second slave device identifier, and a second slave device that is configured with the first slave device identifier and a third slave device identifier. The first slave device may be adapted to respond to communications transmitted over the control data bus and addressed to the first slave device identifier or the second slave device identifier. The second slave device may be adapted to respond to communications transmitted over the control data bus and addressed to the first slave device identifier or the third slave device identifier.

In one aspect, the control data bus is operated in accordance with a camera control data extension (CCIe) bus protocol.

In one aspect, the control data bus is operated in accordance with a camera control data (CCI) bus protocol or in accordance with an Inter-Integrated Circuit (I2C) bus protocol.

In one aspect, the master device is configured to ignore a negative acknowledgement signal that is transmitted by one slave device concurrently with an acknowledgement signal that is transmitted by another slave device.

In one aspect, the first slave device and the second slave device are, or include cameras. The master device may be configured to communicate information concurrently to the first slave device and the second slave device.

In one aspect, the master device is configured to communicate concurrently with the first slave device and the second slave device using the first slave device identifier.

In one aspect, each of a first group of slave devices coupled to the control data bus responds to communications transmitted over the control data bus and addressed to the first slave device identifier. Each of a second group of slave devices coupled to the control data bus responds to communications transmitted over the control data bus and addressed to a fourth slave device identifier that is different from the first slave identifier, the second slave identifier, and the third slave identifier. Each of the first group of slave devices may perform a first function, and each of the second group of slave devices may perform a second function that is different from the first function. The first slave device may be further configured with the fourth slave identifier and may be a member of the first group of slave devices and the second group of slave devices.

In certain aspects of the invention, a method includes maintaining an address list associating each of a plurality of slave devices coupled to a control data bus with a plurality of slave device identifiers and controlling access to the control data bus based on the address list. Controlling access to the control data bus may include, in a first mode of operating the control data bus, communicating concurrently with a first slave device and a second slave device using a first group slave device identifier that is associated with the first slave device and the second slave device and, in a second mode of operating the control data bus, communicating individually with the first slave device using a unique slave device identifier that is associated with the first slave device and is not associated with the second slave device.

In one aspect, broadcasting a first write message concurrently to a first plurality of slave devices using the first group slave device identifier, and broadcasting a second write message concurrently to a second plurality of slave devices using a second group slave device identifier.

In one aspect, the method may include addressing a read command to the first slave device using the unique slave device identifier, and reading data transmitted by the first slave device in response to the read command. Other slave devices coupled to the control data bus may be configured to refrain from responding to the read command.

In one aspect, the control data bus is a CCIe bus, a CCI bus or an I2C bus.

In one aspect, the first slave device and the second slave device are, or include cameras.

In certain aspects of the invention, a device includes means for maintaining an address list associating each of a plurality of slave devices coupled to a control data bus with a plurality of slave device identifiers, and means for controlling access to the control data bus based on the address list. The means for controlling access to the control data may be configured to operate the control data bus in a first mode of operation such that the device communicates concurrently with a first slave device and a second slave device using a first group slave device identifier that is associated with the first slave device and the second slave device, and to operate the control data bus in a first mode of operation such that the device communicates individually with the first slave device using a unique slave device identifier that is associated with the first slave device and is not associated with the second slave device.

In certain aspects of the invention, a storage medium has instructions stored thereon. The storage medium may include a non-transitory storage medium. The instructions may be executable by one or more processors. The instructions, when executed by the one or more processors may cause the one or more processors to maintain an address list associating each of a plurality of slave devices coupled to a control data bus with a plurality of slave device identifiers and control access to the control data bus based on the address list. Access to the control data bus may be controlled by operating the control data bus in a first mode of operation to enable concurrent communications with a first slave device and a second slave device using a first group slave device identifier that is associated with the first slave device and the second slave device, and by operating the control data bus in a first mode of operation to enable individual communications with the first slave device using a unique slave device identifier that is associated with the first slave device and is not associated with the second slave device.

In certain aspects of the invention, a method includes responding at a slave device to a first command transmitted by a bus master on a control data bus when the first command is addressed to a first group slave device identifier, and responding at the slave device to a second command transmitted by the bus master on the control data bus when the second command is addressed to a unique slave device identifier. At least one other slave device may be configured to respond to transmissions addressed to the first group slave device identifier. In some instances, no other slave device is configured to respond to transmissions addressed to the unique slave device identifier.

In one aspect, the control data bus is operated in accordance with CCIe bus protocols, CCI bus protocols. or I2C bus protocols.

In one aspect, a plurality of slave device identifiers associated with the slave device is maintained in storage, and refraining from responding to a read or write command received from the control data bus when the read or write command is addressed to a slave device identifier that is not maintained in the storage. The plurality of slave device identifiers maintained in storage may include the unique slave device identifier and the first group slave device identifier.

In one aspect, the slave device may respond to a third command transmitted by the bus master on the control data bus when the third command is addressed to a second group slave device identifier. A first plurality of slave devices may be configured to respond to transmissions addressed to the first group slave device identifier and a second plurality of slave devices is configured to respond to transmissions addressed to the second group slave device identifier. Each of the first plurality of slave devices may perform a first function, and each of the second plurality of slave devices may perform a second function that is different from the first function.

In certain aspects of the invention, a slave device includes a bus interface adapted to couple the slave device to a control data bus shared with other devices, and a processing circuit coupled to the bus interface and configured to respond to messages addressed using a first slave device identifier that is uniquely associated with the slave device and to messages addressed to a second slave device identifier that is associated with the slave device and at least one other slave device.

In one aspect, the processing circuit may be configured to transmit information on the control data bus in response to a command addressed using the first slave device identifier and received from the control data bus.

In one aspect, the processing circuit may be configured to respond to a first command received from the control data bus when the first command is addressed using the first slave device identifier, and respond to a second command received from the control data bus when the second command is addressed using the second slave device identifier. The processing circuit may be configured to respond to a third command received from the control data bus when the third command is addressed using a third slave device identifier. A first plurality of slave devices may be configured to respond to transmissions addressed to the second slave device identifier and a second plurality of slave devices may be configured to respond to transmissions addressed to the third slave device identifier. Each of the first plurality of slave devices may perform a first function, and each of the second plurality of slave devices may perform a second function that is different from the first function.

In one aspect, the slave device may include a camera, and the control data bus may be operated in accordance with CCIe bus protocols, CCI bus protocols or I2C bus protocols.

In one aspect, the slave device may include storage configured to maintain the first slave device identifier and the second slave device identifier.

In certain aspects of the invention, a device includes means for responding at a slave device to a first command transmitted by a bus master on a control data bus when the first command is addressed to a first group slave device identifier, and means for responding at the slave device to a second command transmitted by the bus master on the control data bus when the second command is addressed to a unique slave device identifier. At least one other slave device may be configured to respond to transmissions addressed to the first group slave device identifier. In some instances, no other slave device is configured to respond to transmissions addressed to the unique slave device identifier.

In certain aspects of the invention, a storage medium has instructions stored thereon. The storage medium may include a non-transitory storage medium. The instructions may be executable by one or more processors. The instructions, when executed by the one or more processors may cause the one or more processors to respond at a slave device to a first command transmitted by a bus master on a control data bus when the first command is addressed to a first group slave device identifier, and respond at the slave device to a second command transmitted by the bus master on the control data bus when the second command is addressed to a unique slave device identifier. At least one other slave device may be configured to respond to transmissions addressed to the first group slave device identifier. In some instances, no other slave device is configured to respond to transmissions addressed to the unique slave device identifier.

DRAWINGS

Various features, nature, and advantages may become apparent from the detailed description set forth below when taken in conjunction with the drawings in which like reference characters identify correspondingly throughout.

Figure 9:
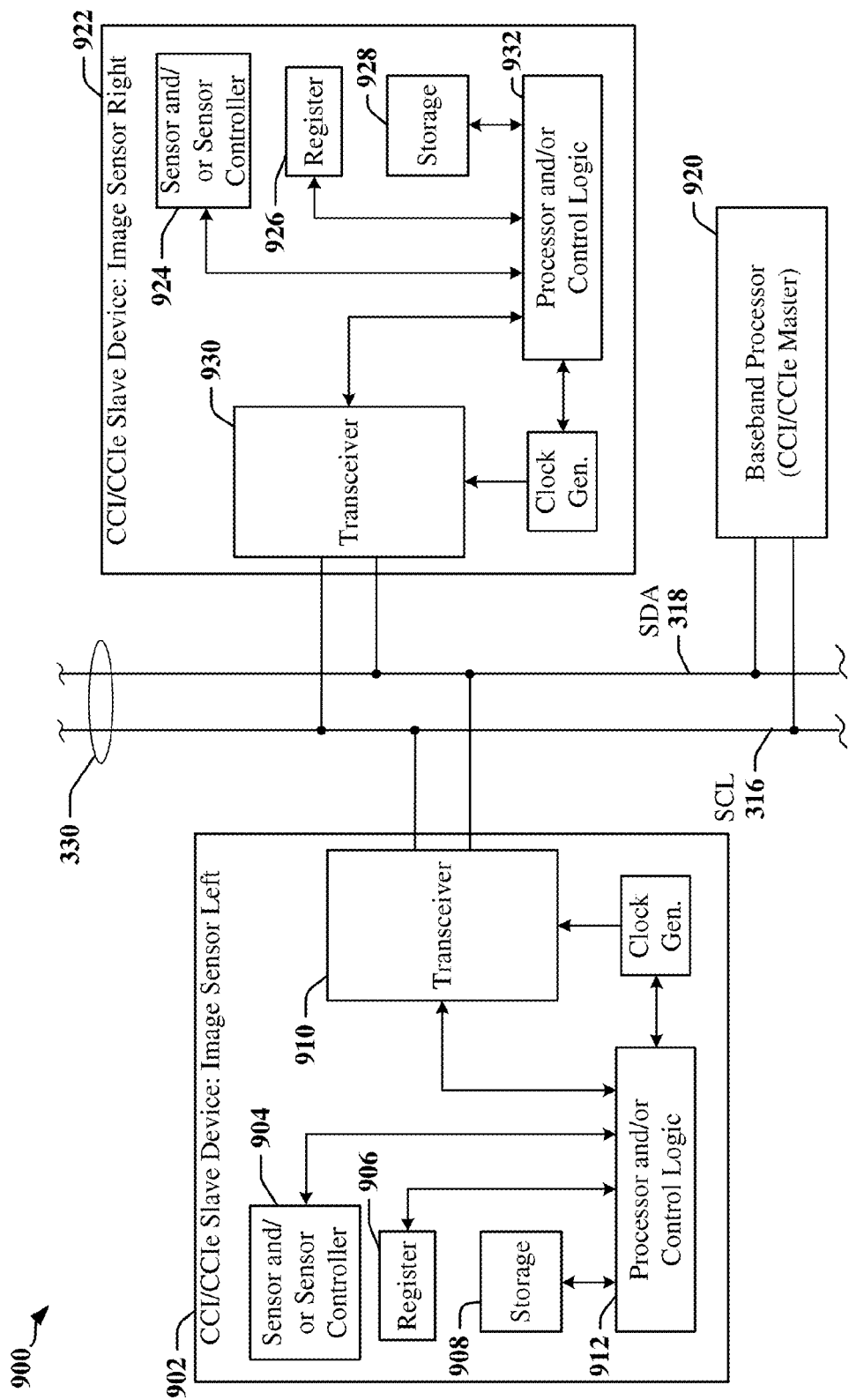

FIG. 9 a diagram illustrating certain aspects of an apparatus that includes two imaging devices coupled as slaves to a camera control bus.

Figure 10:
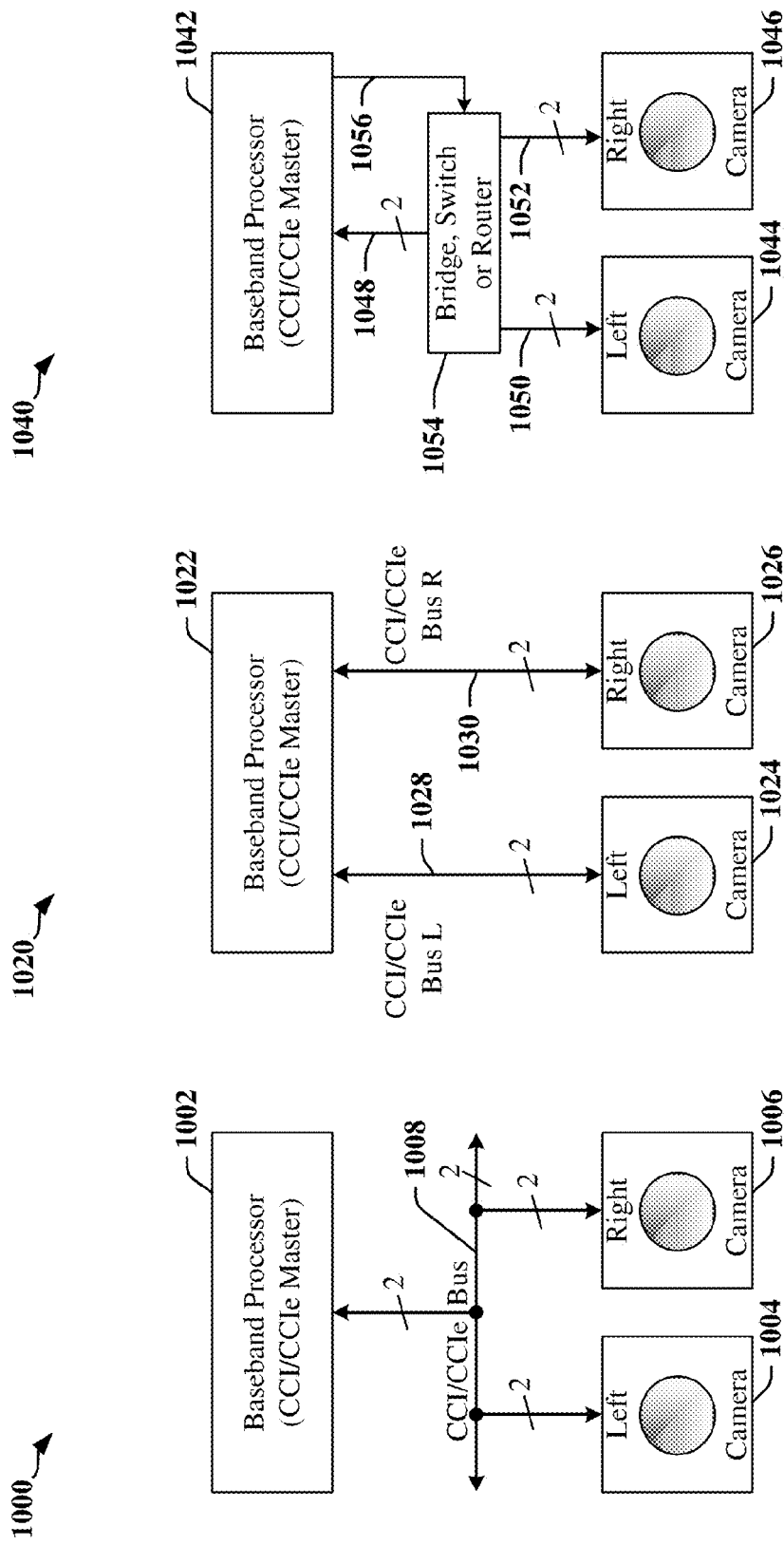

FIG. 10 illustrates examples of configurations of multiple cameras coupled as slaves to a camera control bus.

Figure 11:
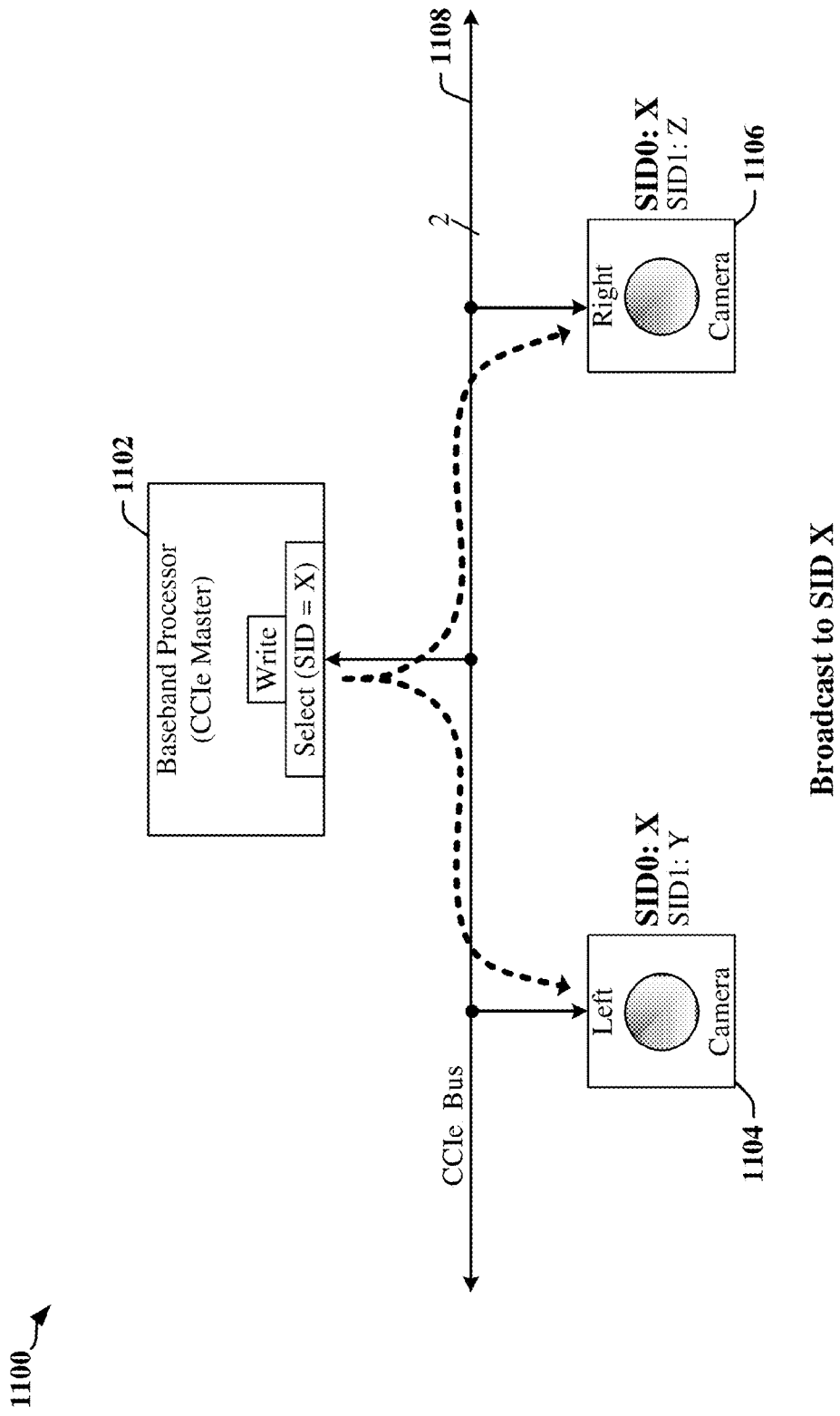

FIG. 11 illustrates a first example of the operation of an apparatus having two cameras adapted to maintain and respond to multiple identifiers on a CCIe bus.

Figure 12:
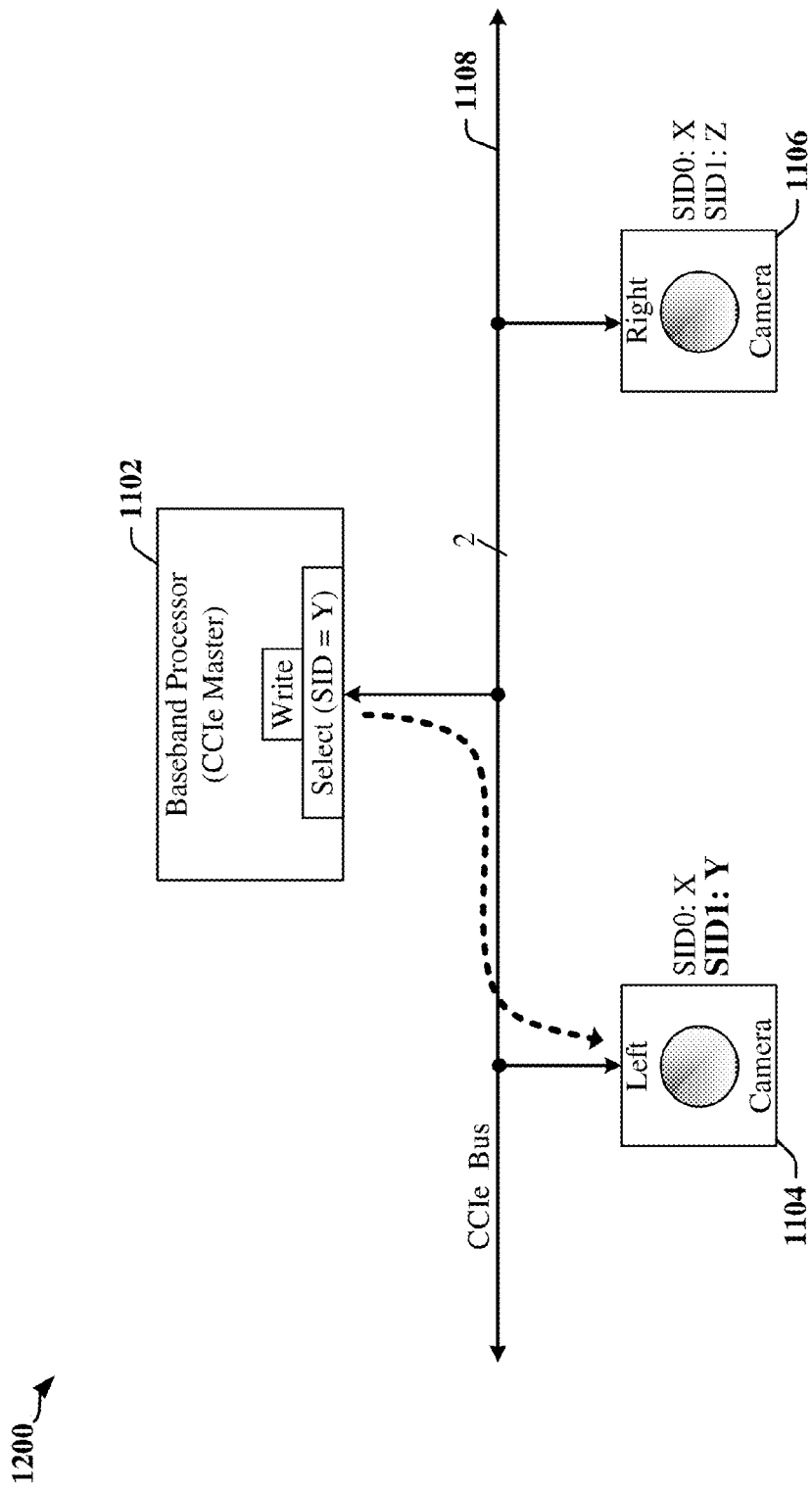

FIG. 12 illustrates a second example of the operation of an apparatus having two cameras adapted to maintain and respond to multiple identifiers on a CCIe bus.

Figure 13:
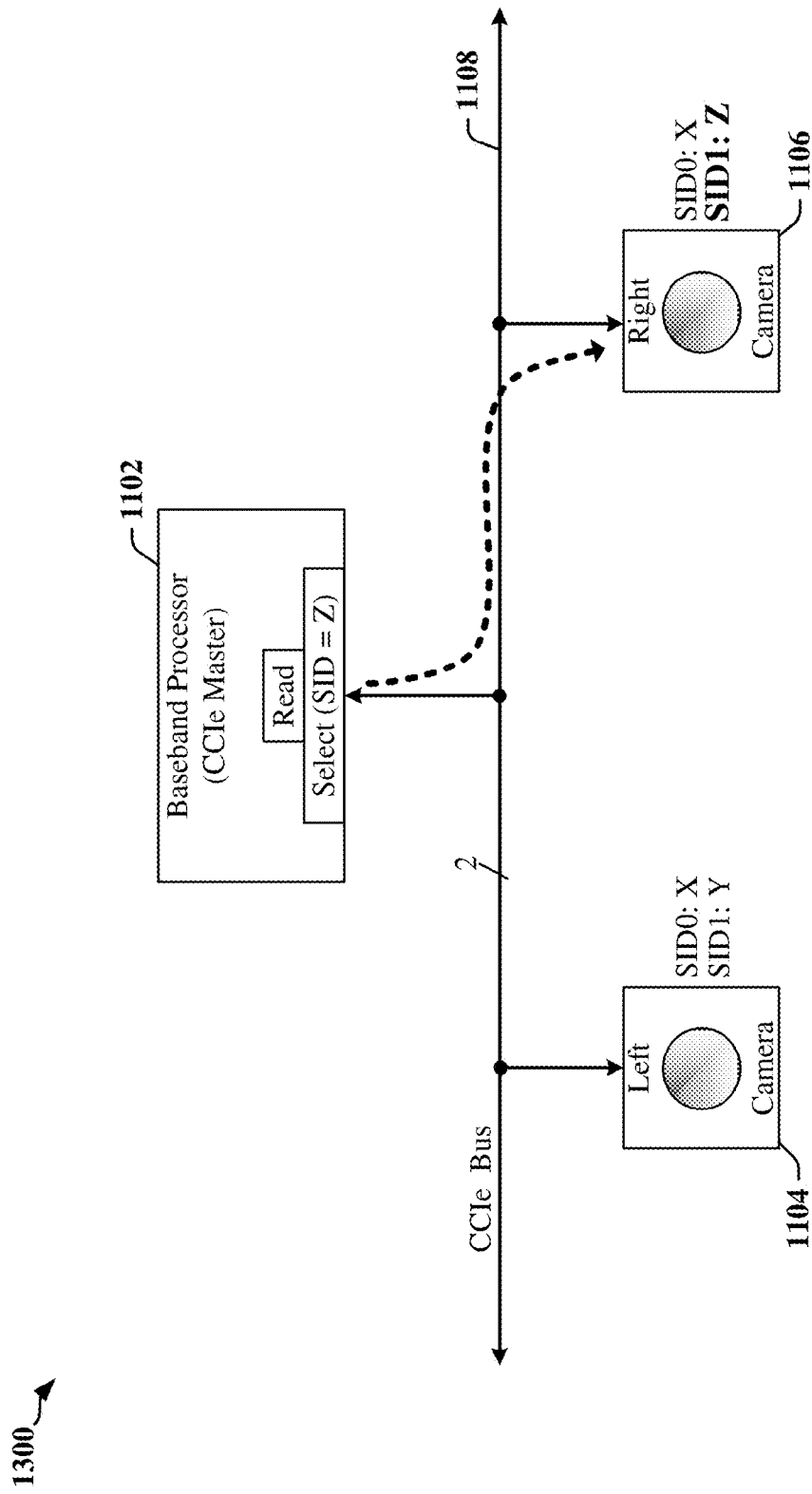

FIG. 13 illustrates a third example of the operation of an apparatus having two cameras adapted to maintain and respond to multiple identifiers on a CCIe bus.

Figure 14:
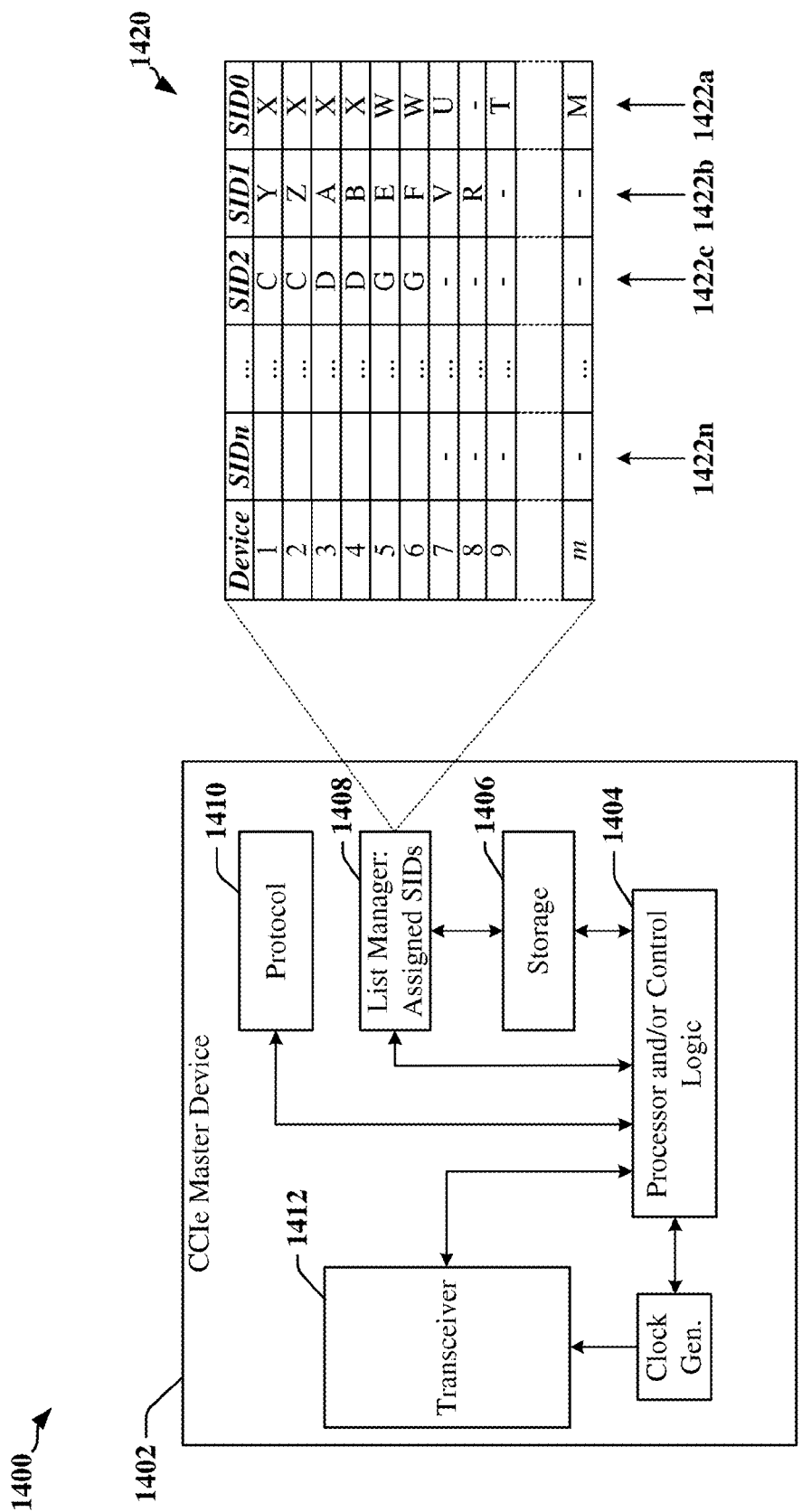

FIG. 14 illustrates certain aspects of a CCIe master node adapted to support slave devices provided with multiple identifiers.

Figure 15:
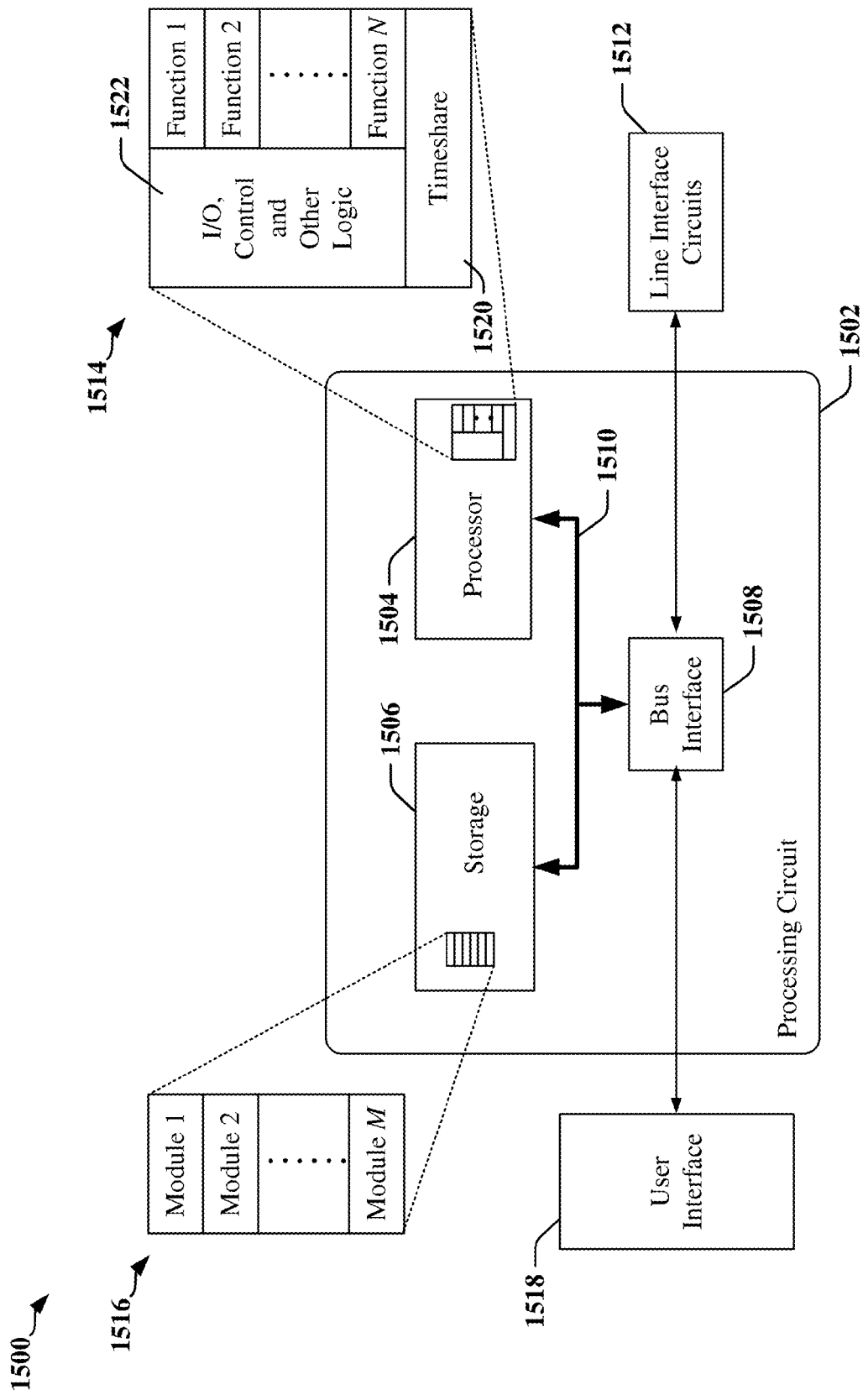

FIG. 15 illustrates a simplified example of a hardware implementation for an apparatus employing a processing circuit that may be adapted or configured to perform one or more functions disclosed herein.

Figure 16:
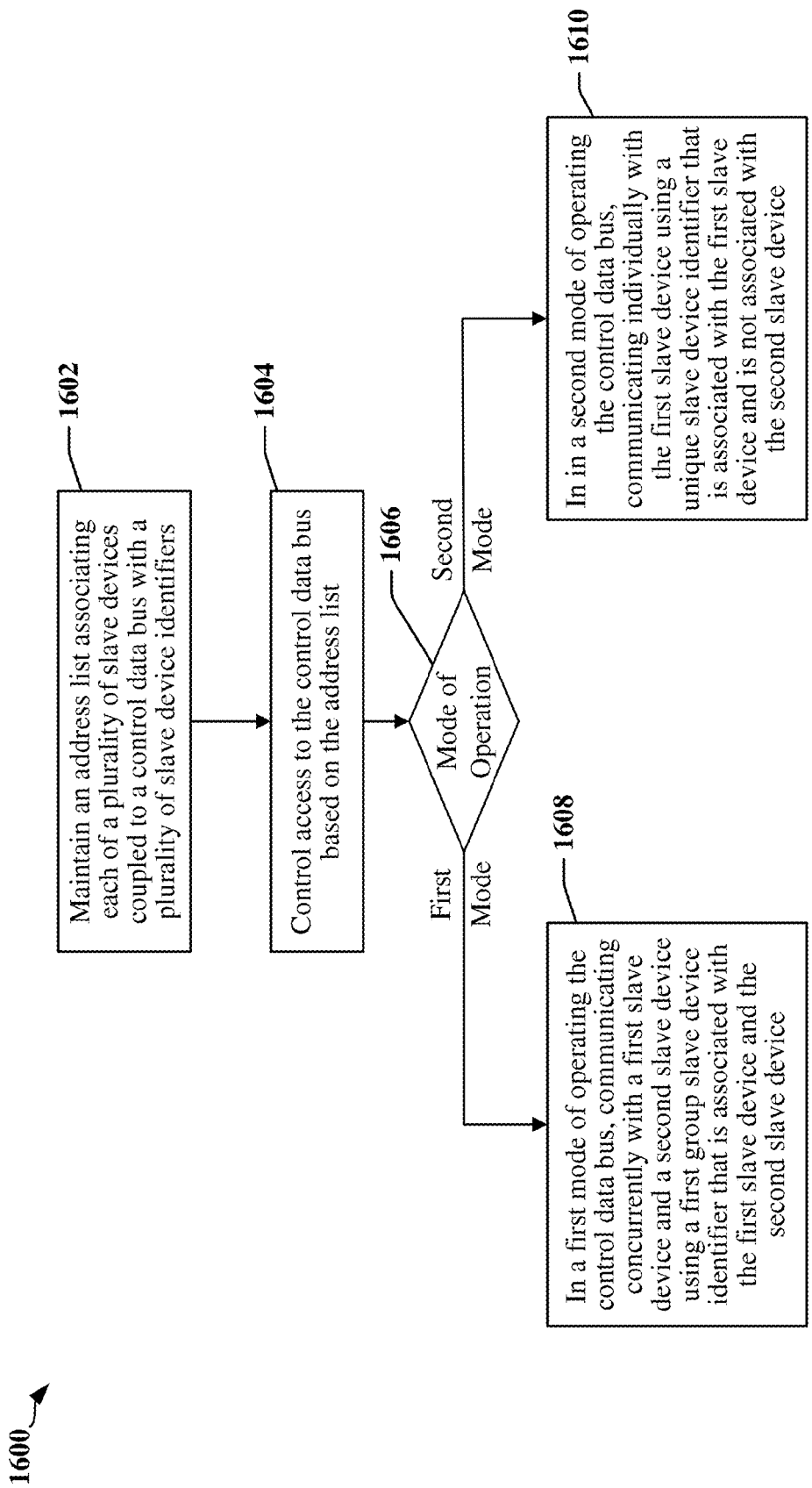

FIG. 16 is a flowchart of a method for controlling a serial bus coupling slave devices that have been provided with multiple identifiers.

Figure 17:
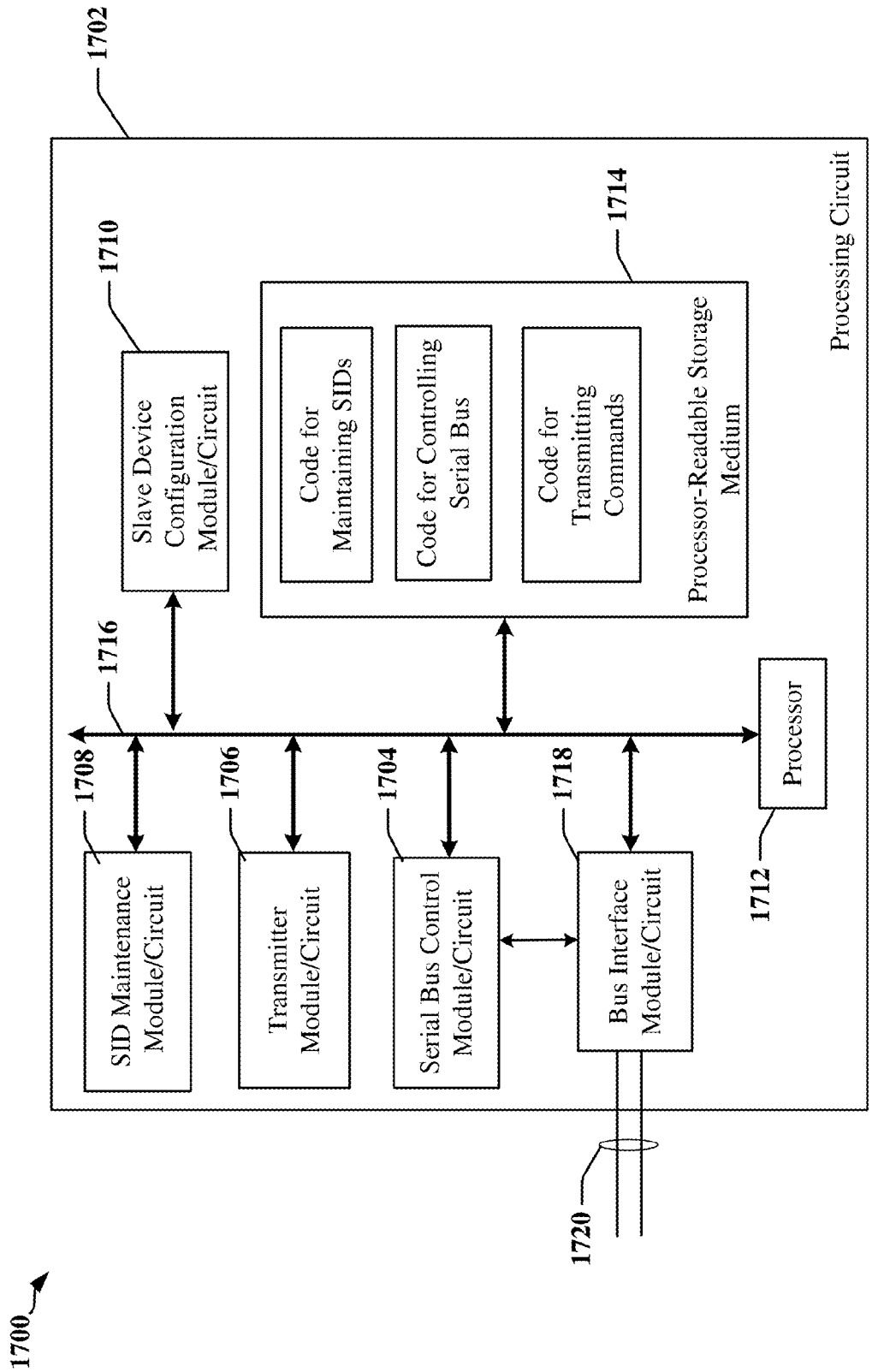

FIG. 17 is a diagram illustrating an example of a hardware implementation for controlling a serial bus that couples slave devices that have been provided with multiple identifiers.

Figure 18:
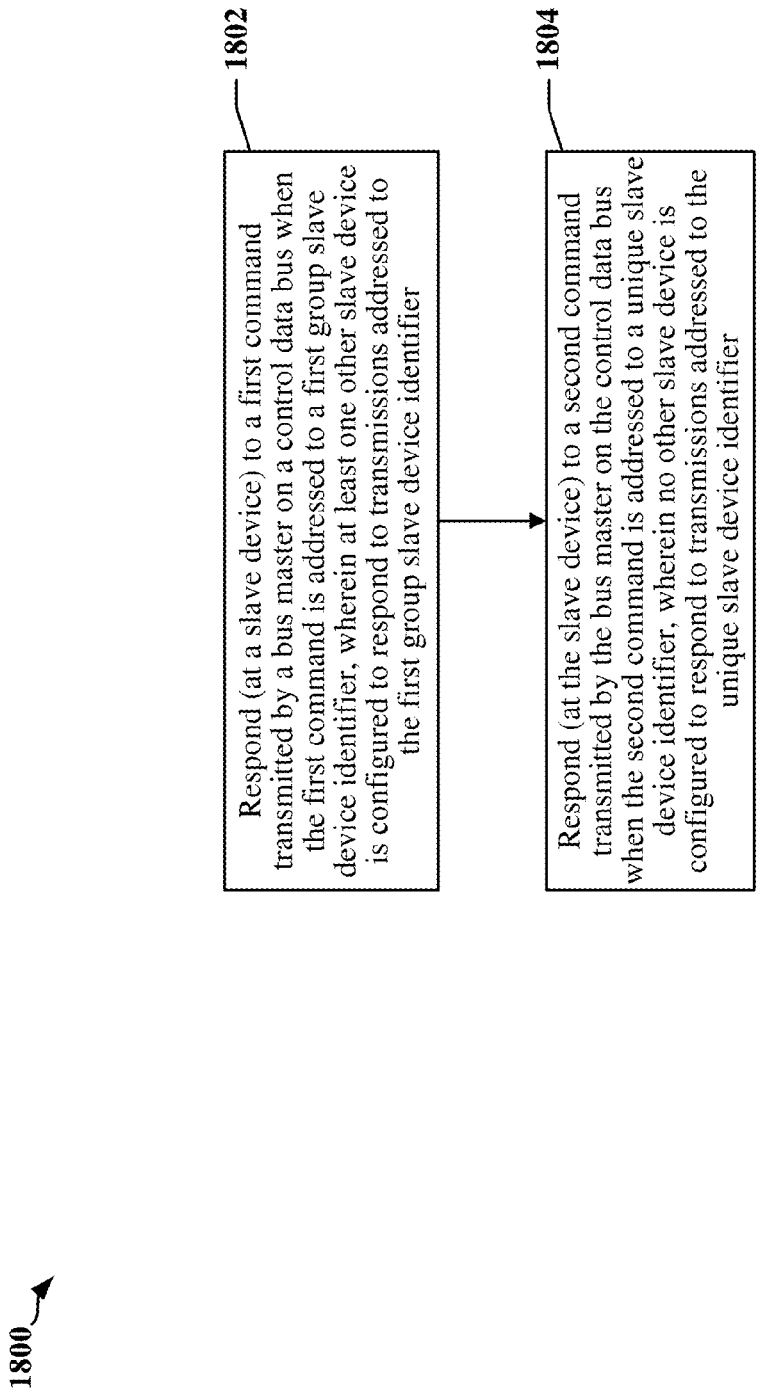

FIG. 18 is a flowchart of a method for operating slave devices that have been provided with multiple identifiers.

Figure 19:
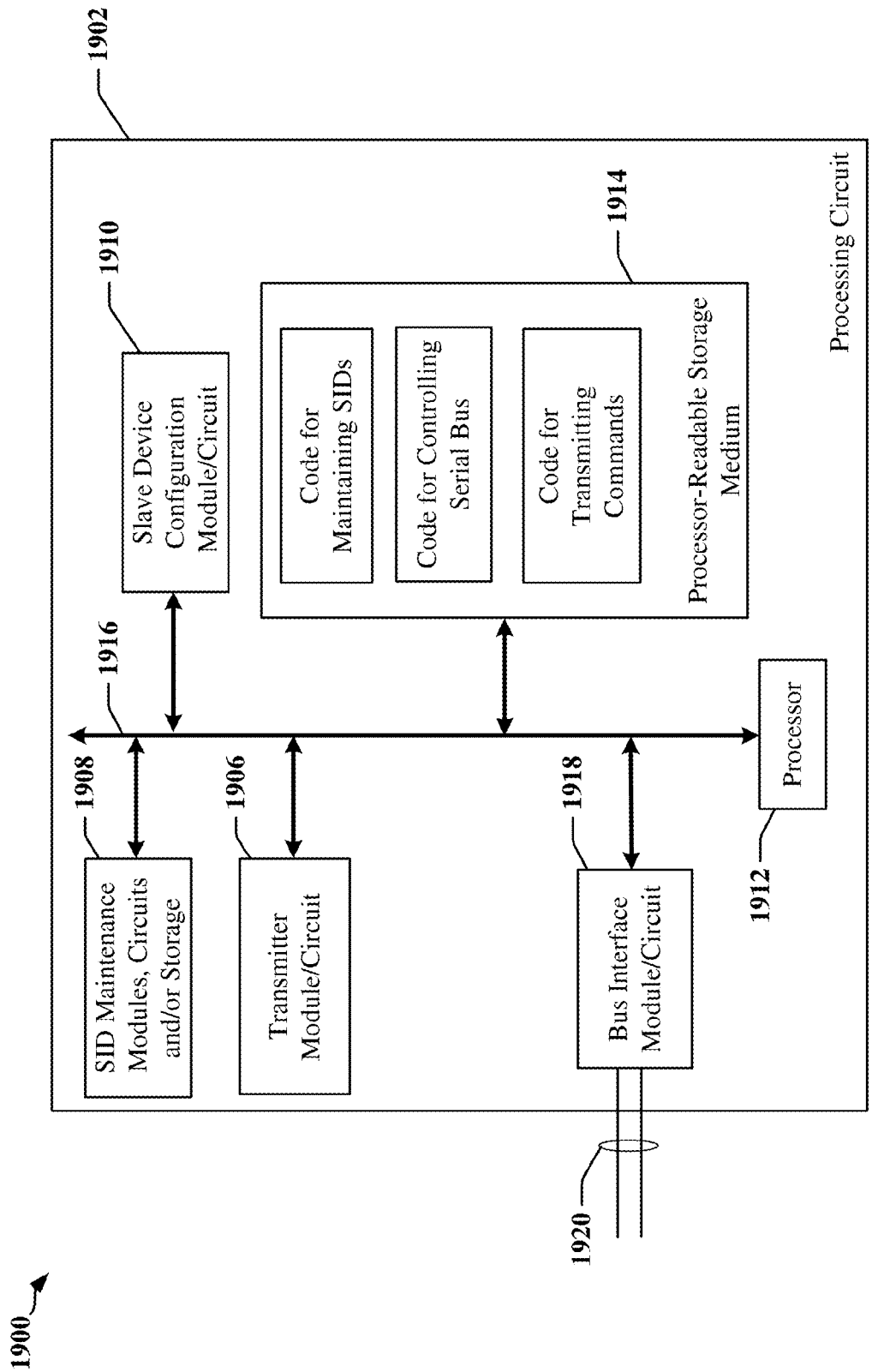

FIG. 19 is a diagram illustrating an example of a hardware implementation for operating slave devices that have been provided with multiple identifiers.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures, and techniques may not be shown in detail in order not to obscure the embodiments.

Various features, nature, and advantages may become apparent from the detailed description set forth below when taken in conjunction with the drawings in which like reference characters identify correspondingly throughout.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal. Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Overview

Certain embodiments disclosed herein provide systems, methods and apparatus that can improve the performance of a communications interface of a camera control interface (CCI) bus, which may be based on the I2C bus protocols and configurations. The CCI may employ a two-wire, bi-directional, half duplex, serial interface configured as a bus connecting a master and one or more slaves. CCI operations may be compatible with I2C bus operations.

The CCI extension (CCIe) bus can extend the capabilities of a conventional I2C or CCI bus for devices that are configured for enhanced features supported by the CCIe bus. For example, the CCIe bus may support a higher bit rate than an I2C or CCI bus. According to certain aspects disclosed herein, some versions of the CCIe bus may be configured or adapted to support bit rates of 16.7 megabits per second (Mbps) or more, and some versions of the CCIe bus 230 may be configured or adapted to support data rates of at least 23 Mbps. The CCI extension (CCIe) devices may be deployed using the I2C bus to provide a two-wire, bi-directional, half-duplex, serial interface that can operate at data rates that are significantly greater than the data rates obtained using I2C or CCI modes of operation.

Slave devices coupled to a serial bus such as the I2C bus, the CCI bus, or the CCIe bus may be adapted to respond to a plurality of identifiers. In one example, two or more slave devices may be responsive to a common, group identifier such that a master device can address commands and data to the two or more slave devices simultaneously in order to produce synchronized control of certain operational aspects of the slave devices. The slave devices may be equipped with individualized, or unique identifiers that permit on-to-one communication between each slave device and a bus master.

Figure 1:
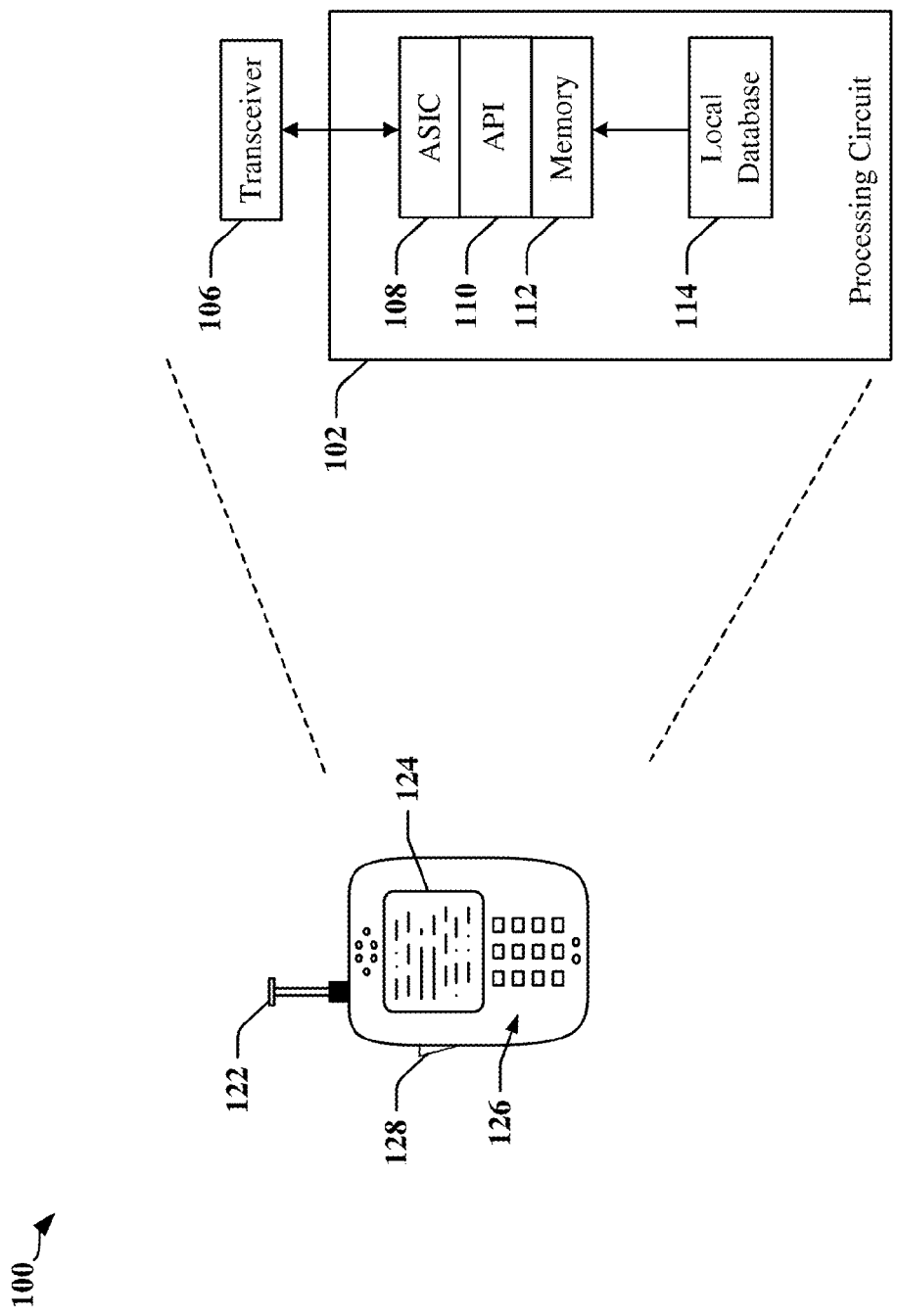
FIG. 1 depicts an apparatus employing a data link between integrated circuit devices that selectively operates according to one of plurality of available standards.

Certain aspects of the invention may be applicable to communications links deployed between electronic devices that may include subcomponents of an apparatus such as a telephone, a mobile computing device, an appliance, automobile electronics, avionics systems, wearable computing devices, appliances, etc. FIG. 1 depicts an apparatus that may employ a communication link between IC devices. In one example, the apparatus 100 may include a wireless communication device that communicates through an RF transceiver with a radio access network (RAN), a core access network, the Internet and/or another network. The apparatus 100 may include a communications transceiver 106 operably coupled to processing circuit 102. The processing circuit 102 may include one or more IC devices, such as an application-specific IC (ASIC) 108. The ASIC 108 may include one or more processing devices, logic circuits, and so on. The processing circuit 102 may include and/or be coupled to processor readable storage such as a memory 112 that may maintain instructions and data that may be executed by the processing circuit 102. The processing circuit 102 may be controlled by one or more of an operating system or an application programming interface (API) 110 layer that supports and enables execution of software modules residing in storage media, such as the memory device 112 of the wireless device. The memory device 112 may include read-only memory (ROM) or random-access memory (RAM), electrically erasable programmable ROM (EEPROM), flash cards, or any memory device that can be used in processing systems and computing platforms. The processing circuit 102 may include or access a local database 114 that can maintain operational parameters and other information used to configure and operate apparatus 100. The local database 114 may be implemented using one or more of a database module, flash memory, magnetic media, EEPROM, optical media, tape, soft or hard disk, or the like. The processing circuit 102 may also be operably coupled to external devices such as antenna 122, display 124, operator controls, such as button 128 and keypad 126 among other components.

Figure 2:
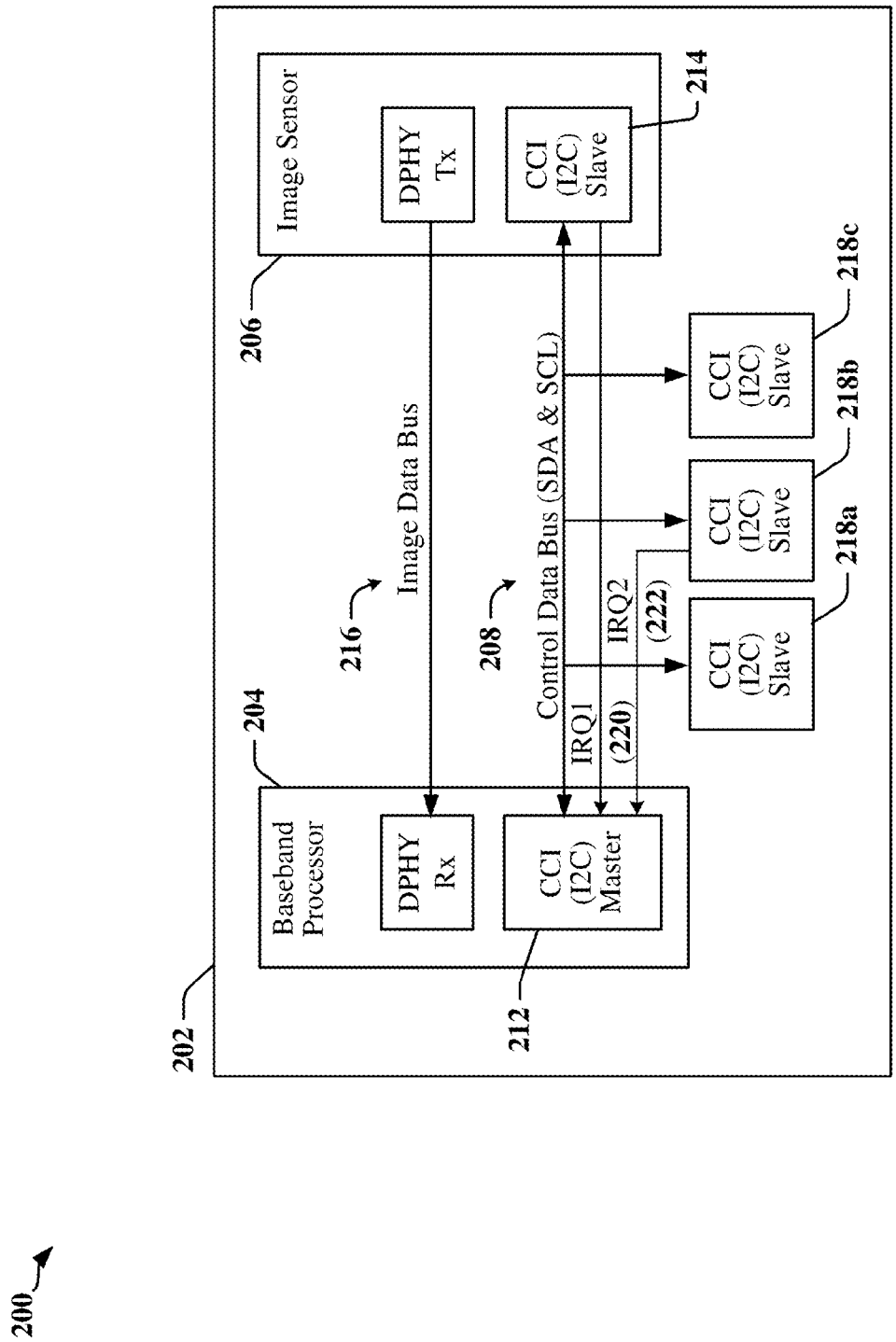
FIG. 2 is a block diagram illustrating a device having a baseband processor and an image sensor and implementing an image data bus and a control data bus.

FIG. 2 is a block diagram 200 illustrating a simplified example of a device 202 that has a baseband processor 204 and an image sensor 206. An image data bus 216 and a multi-mode control data bus 208 may be implemented in the device 202. The diagram 200 illustrates a camera device 202 by way of example only, and various other devices and/or different functionalities may implement, operate and/or communicate using the control data bus 208. In the depicted example, image data may be sent from the image sensor 206 to the baseband processor 204 over an image data bus 216, such as the "DPHY" high-speed differential link defined by MIPI. In one example, the control data bus 208 may have two wires that are configurable for operation in an I2C bus mode. Accordingly, the control data bus 208 may include SCL and SDA wires. The SCL may carry a clock signal that may be used to synchronize data transfers over the control data bus 208 according to I2C protocols. The data line SDA and clock line SCL may be coupled to multiple devices 212, 214, and 218 on the control data bus 208. In the example, control data may be exchanged between the baseband processor 204 and the image sensor 206 as well as other peripheral devices 218 via the control data bus 208. According to I2C protocols, clock speeds on the SCL wire may be up to 100 KHz for normal I2C operation, up to 400 KHz for I2C fast mode, and up to 1 MHz for I2C fast mode plus (Fm+). These operating modes over an I2C bus may be referred to as a CCI mode when used for camera applications.

Figure 3:
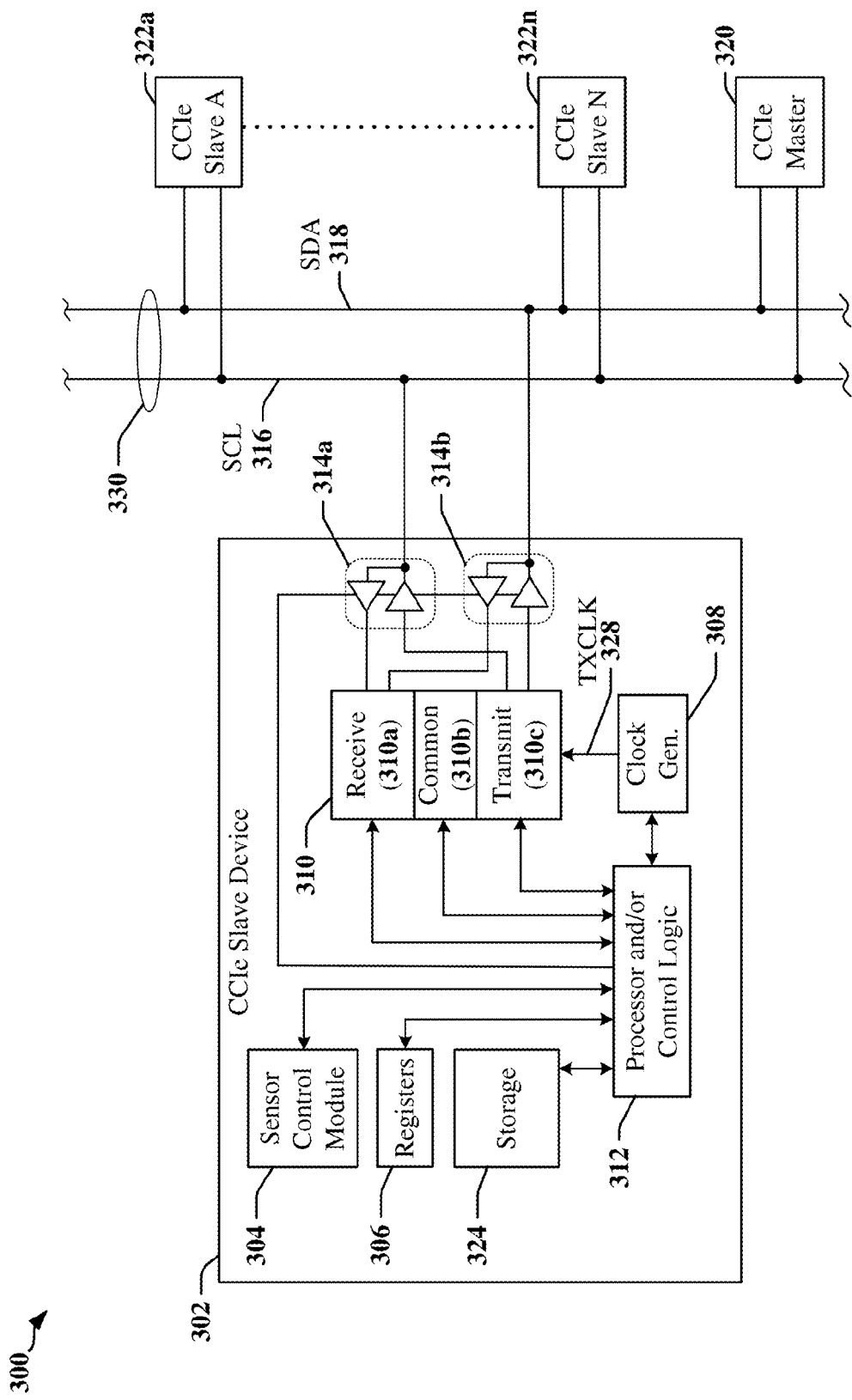
FIG. 3 is a diagram that illustrates a simplified system architecture for an apparatus employing a data link between IC devices according to certain aspects disclosed herein.

FIG. 3 is a block schematic diagram illustrating certain aspects of an apparatus 300 that includes a slave device 302 that has an image sensor 304 and that is coupled to a communications bus such as a CCIe bus 330. The apparatus 300 may be embodied in one or more of a wireless mobile device, a mobile telephone, a mobile computing system, a wireless telephone, a notebook computer, a tablet computing device, a media player, a gaming device, a wearable computing device, an appliance, or the like. The apparatus 300 may include multiple devices 302, 320, and/or 322a-322n, which communicate using a serial bus 330.

According to certain aspects disclosed herein, two or more of the devices 302, 320 and/or 322a-322n may be configured or adapted to use the serial bus 330 in a CCIe mode of operation. In the CCIe mode of operation, the serial bus 330 may be referred to as the CCIe bus 230. The CCIe bus 230 may provide higher data transfer rates between devices 302, 320 and/or 322a-322n that are compatible with CCIe bus operations. Such devices 302, 320 and/or 322a-322n may be referred to as CCIe devices. The CCIe devices 302, 320 and/or 322a-322n may attain higher data rates when communicating with each other by encoding data as symbols transmitted on both the SCL signal wire 316 and the SDA signal wire 318 of a conventional CCI or I2C bus 330. CCIe devices, CCI and/or I2C devices may coexist on the same CCIe bus 330. For example, data may be transmitted using CCIe encoding in a first time interval, and other data may be transmitted according to I2C signaling conventions in a different time interval. The CCIe bus 330 can extend the capabilities of a conventional CCI bus for devices that are configured for enhanced features supported by the CCIe bus 330. For example, the CCIe bus 330 may support a higher bit rate than a CCI bus 330. According to certain aspects disclosed herein, some versions of the CCIe bus 330 may be configured or adapted to support bit rates of 16.7 Mbps or more, and some versions of the CCIe bus may be configured or adapted to support data rates of at least 23 megabits per second.

In the example illustrated in FIG. 3, an imaging device 302 is configured to operate as a slave device on the CCIe bus 330. The imaging device 302 may be adapted to provide a sensor control module 304 that includes or manages an image sensor, for example. In addition, the imaging device 302 may include configuration registers 306 and/or other storage devices 324, a processing circuit and/or control logic 312, a transceiver 310 and line drivers/receivers 314a and 314b. The processing circuit and/or control logic 312 may include a processor such as a state machine, sequencer, signal processor or general-purpose processor. The transceiver 310 may include a receiver 310a, a transmitter 310c and certain common circuits 310b, including timing, logic and storage circuits and/or devices. In some instances, the transceiver 310 may include encoders and decoders, clock and data recovery circuits, and the like.

A transmit clock (TXCLK) signal 328 may be provided to the transmitter 310c, where the TXCLK signal 328 can be used to determine data transmission rates for a CCIe communication mode. The TXCLK signal 328 may be embedded within sequences of symbols transmitted on the CCIe bus 330, when both the SDA wire 318 and the SCL wire 316 are used to encode transmitted data. In one example, the TXCLK signal 328 may be embedded using transition clock transcoding, whereby data to be transmitted over the physical link 330 is transcoded such that a change of state of at least one wire 316 and/or 318 occurs between each pair of consecutive symbols transmitted on the CCIe bus 330.

In one example disclosed herein, CCIe devices 302, 320, and/or 322a-322n may communicate using the two-wires 316, 318 of a control data bus 330. For example, the two-wire control data bus 330 may support CCIe bi-directional, half-duplex modes of communication that can provide significantly greater data rates than the data rates supported by I2C or CCI modes of operation. The CCIe devices 302, 320, and/or 322a-322n may transmit data on both the SCL wire 316 and the SDA wire 318 of the control data bus 330, with clock information embedded in a sequence of symbols transmitted on the two-wire control data bus 330. Certain CCIe devices 320 may be configured as a bus master, and certain devices 302, and/or 322a-322n may be configured as slave devices. The CCIe devices 302, 320, and/or 322a-322n may be compatible with, or coexist with I2C and/or CCI devices coupled to the control data bus 330, such that a CCIe device 302, 320, or 322a-322n may communicate with one or more other CCIe devices 302, 320, and/or 322a-322n using CCIe protocols and signaling specifications, even when I2C devices are monitoring the control data bus 330. One example disclosed herein provides an interface that can handle multiple slaves 302, and/or 322a-322n coupled to the bus, with a single master device 320, when both CCIe and I2C/CCI devices are deployed on the same bus. In the latter example, two or more CCIe devices 302, 320, and/or 322a-322n may communicate using CCIe protocols, and any communication transaction with an I2C or CCI device is conducted in accordance with I2C bus protocols.

Figure 4:
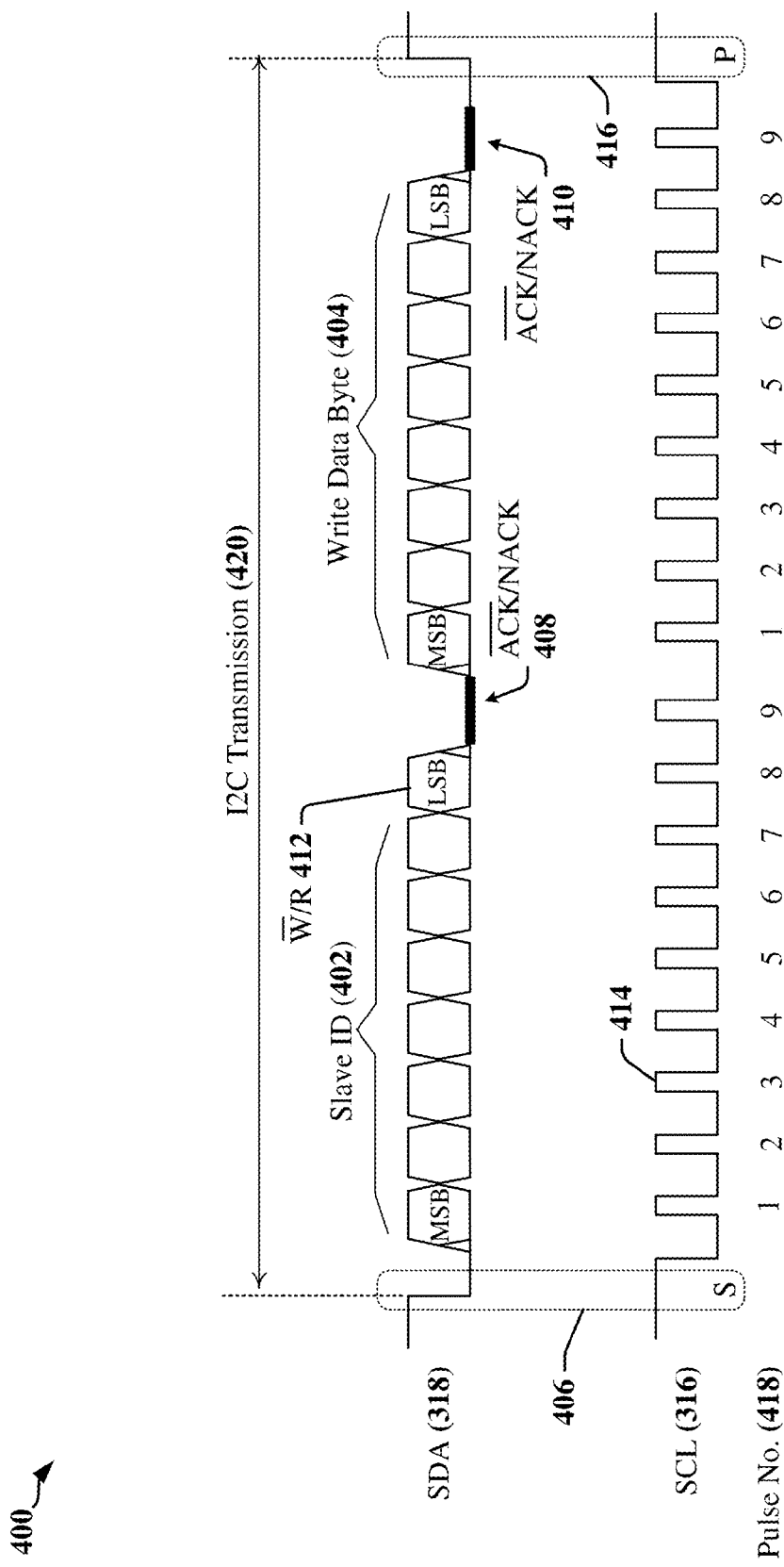
FIG. 4 is a timing diagram illustrating an I2C one-byte write data operation.

FIG. 4 is a timing diagram 400 illustrating an example of single-byte write data operation when a serial bus 330 is operated in accordance with I2C protocols. In this example, the nodes 302, 320, 322a-322n coupled to the serial bus 330 of FIG. 3 may be assumed to be operable in CCIe and I2C/CCI modes. Each I2C transmission 420 commences with a start condition 406 that is asserted on the serial bus 330, and terminates when a stop condition 416 is asserted on the serial bus 330. The start condition 406 is asserted when the SDA signal wire 318 transitions low while the SCL signal wire 316 is held in a high state. The stop condition 416 is asserted when the SDA signal wire 318 transitions high while the SCL signal wire 316 is held in a high state. According to I2C protocols, transitions on the SDA signal wire 318 occur when the SCL signal wire 316 is low, except for start condition 406 and stop conditions 416.

In typical I2C operations, an I2C master node sends a 7-bit slave ID 402 on the SDA signal wire 318 to indicate which slave node 302, 322a-322n on the I2C bus 330 the master node wishes to access, followed by a Read/Write bit 412 that indicates whether the operation is a read or a write operation. In one example, the Read/Write bit 412 is at logic 0 to indicate a write operation. In another example, the Read/Write bit 412 is at logic 1 to indicate a read operation. Only the slave node 302, 322a-322n whose ID matches with the 7-bit slave ID 402 is permitted respond to the write (or any other) operation. The 7-bit slave ID 402 permits 128 addresses for use on the I2C/CCI bus 330. In order for an I2C slave node 302, 322a-322n to detect a transmitted slave ID 402 that matches its own ID, the master node 320 may transmit at least 8-bits on the SDA line 318, together with 8 clock pulses on the SCL line 316. This behavior may be exploited to transmit data in CCIe operating modes in order to prevent legacy I2C slave nodes from reacting to CCIe operations.

Figure 5:
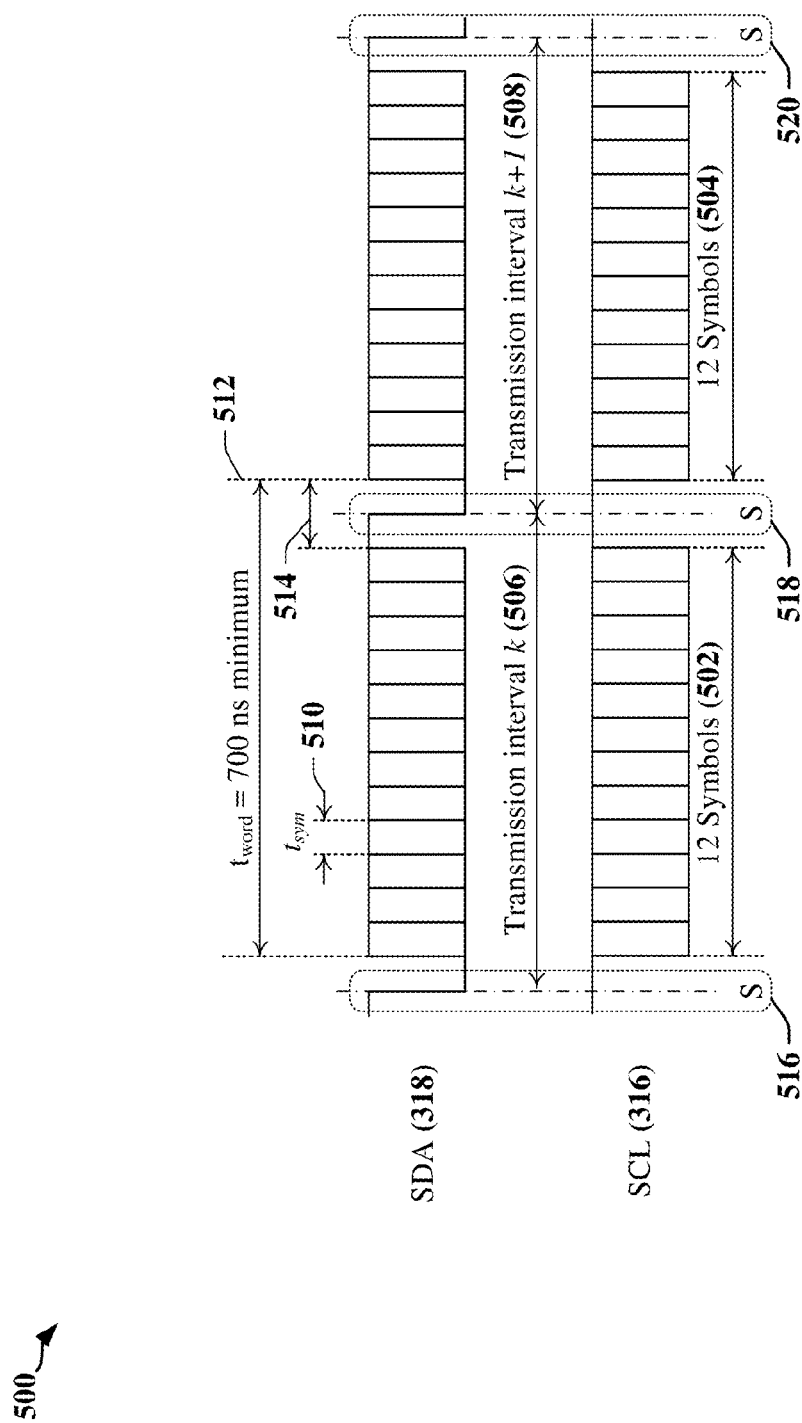
FIG. 5 is a timing diagram illustrating an example of data transmissions on a serial bus in accordance with CCIe protocols.

FIG. 5 is a timing diagram 500 that illustrates data transmission on a serial bus 330 that is operated in accordance with CCIe protocols, and when two or more communicating devices 302, 320, 322a-322n are configured or adapted to communicate in accordance with CCIe protocols. In a CCIe mode of operation, data is encoded into a set of two-bit symbols transmitted sequentially on the signal wires 316, 318 of the CCIe bus 330. Sequences of symbols 502, 504 may be transmitted in successive transmission intervals 506, 508. Each sequence of symbols 502, 504 is preceded by a start condition 516, 518, 520. The start conditions 516, 518, 520 are asserted when the SDA signal wire 318 transitions low while the SCL signal wire 316 is held in a high state. According to CCIe protocols, transitions on the SDA signal wire 318 may occur at the same time that transitions occur on the SCL signal wire 316 when a sequence of symbols 502, 504 is being transmitted. Start conditions 516, 518, 520 may occupy two symbol intervals.

In the illustrated example, each sequence of symbols 502, 504 includes 12 symbols and encodes 20-bit data elements that may include 16 bits of data and 3 bits of overhead. Each symbol in the sequence of 12 symbols 502, 504 defines the signaling state of the SDA signal wire 318 and the SCL signal wire 316 for each symbol period ($t_{sym}$) 510. In one example, push-pull drivers 314a, 314b used to drive the signal wires 316, 318 may support a symbol period 510 of 50 ns duration, using a 20 MHz symbol clock. The two-symbol sequence, which may be denoted as {3,1}, is transmitted in the period 514 between consecutive sequences of symbols 502 and 504 to provide a start condition 518. For the resulting 14-symbol transmission (12 symbols payload and a start condition 516, 518, or 520), the minimum elapsed time 512 between the start of a first transmission interval 506 and the start of a second transmission interval 508 may be calculated as:

$$T_{word}=14 \times t_{sym}=700 \text{ ns}.$$

Thus, 20 bits may be transmitted every 700 ns, yielding a raw bit rate of approximately 28.6 Mbps with a useful bit rate of approximately 22.86 Mbps, since 16 data bits are transmitted in each 12 symbol word 502, 504 in each transmission interval 506, 508.

Figure 6:
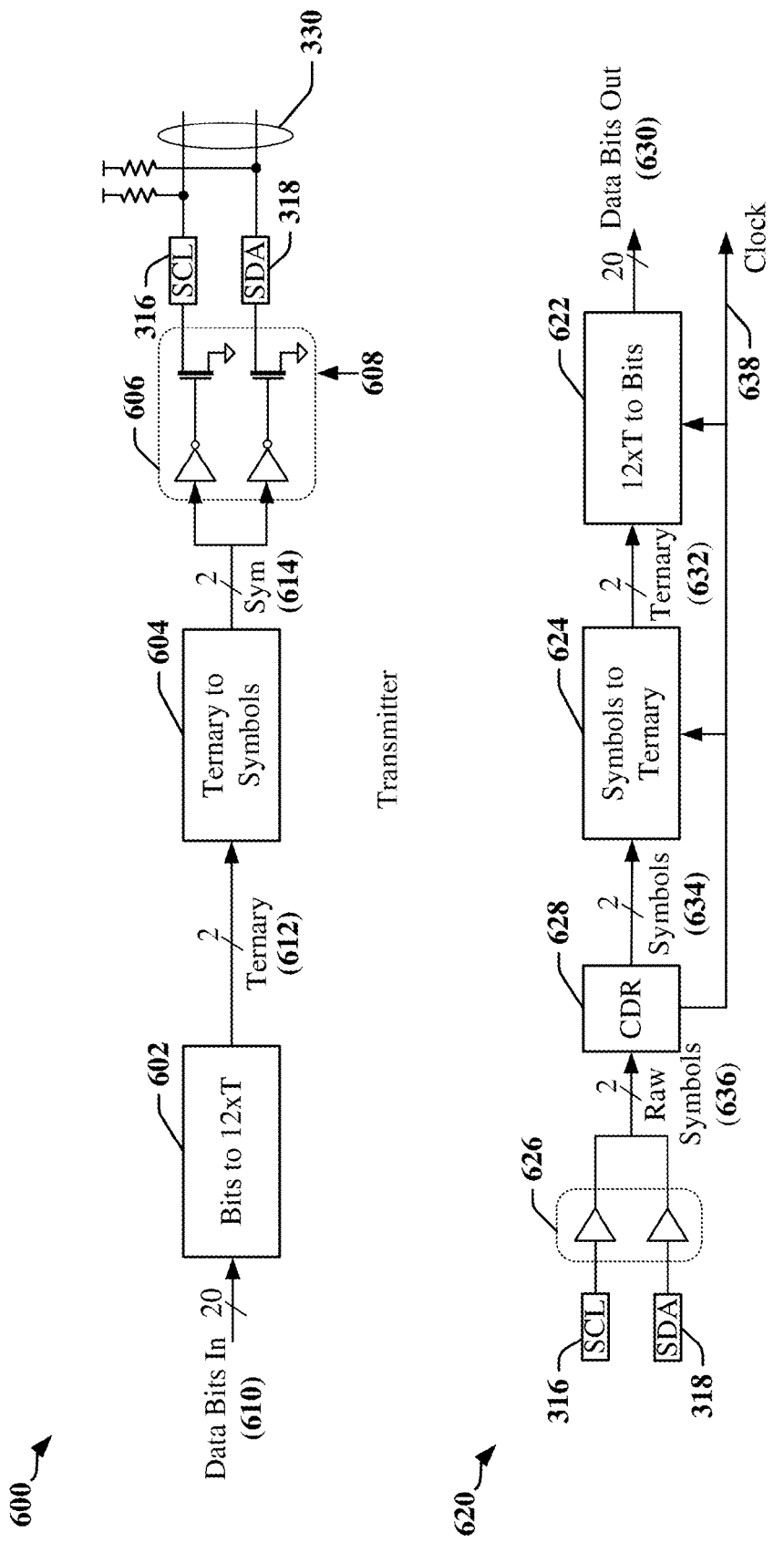
FIG. 6 illustrates certain aspects of a transmitter and a receiver according to certain aspects disclosed herein.

FIG. 6 is a block diagram illustrating an example of a transmitter 600 and a receiver 620 configured according to certain aspects disclosed herein. For CCIe operations, the transmitter 600 may transcode data 610 into ternary (base-3) transition numbers 612 that are used to select symbols for transmission on the SCL 316 and SDA 318 signal wires. In the example depicted, each data element (also referred to as a data word) of the input data 610 may have 19 or 20 bits. A transcoder 602 may receive the input data 610 and produce a sequence of ternary transition numbers 612 for each data element. The ternary transition numbers 612 may be encoded in two bits and there may be a sequence of 12 ternary numbers in each ternary transition number 612. An encoder 604 produces a stream of 2-bit symbols 614 that are transmitted through line drivers 606. In the example depicted, the line drivers 606 include open-drain output transistors 608. However, in other examples, the line drivers 606 may drive the SCL 316 and SDA 318 signal wires using push-pull drivers (such as the drivers 314a, 314b in FIG. 3). A transition is provided in the state of at least one of the SCL signal wire 316 and the SDA signal wire 318 between consecutive symbols in the output stream of 2-bit symbols 614. The encoder 604 may provide the transitions between the consecutive symbols 614 by ensuring that no pair of consecutive symbols includes two identical symbols. The availability of a transition of state in at least one wire 316 and/or 318 permits a receiving circuit 620 to extract a receive clock 638 from the stream of data symbols 614.

In a CCIe system, the receiver 620 may include or cooperate with a clock and data recovery circuit (CDR) 628. The receiver 620 may include line interface circuits 626 that provide a stream of raw 2-bit symbols 636 to the CDR 628. The CDR 628 extracts a receive clock 638 from the raw symbols 636 and provides a stream of 2-bit symbols 634 with the receive clock 638 to other circuits 624 and 622 of the receiver 620. In some examples, the CDR 628 may produce multiple clocks 638. A decoder 624 may use the receive clock 638 to decode the stream of symbols 634 into sequences of 12 ternary numbers 632. The ternary numbers 632 may be encoded using two bits. A transcoder 622 may then convert each sequence of 12 ternary numbers 632 into 19-bit or 20-bit output data elements 630.

Figure 7:
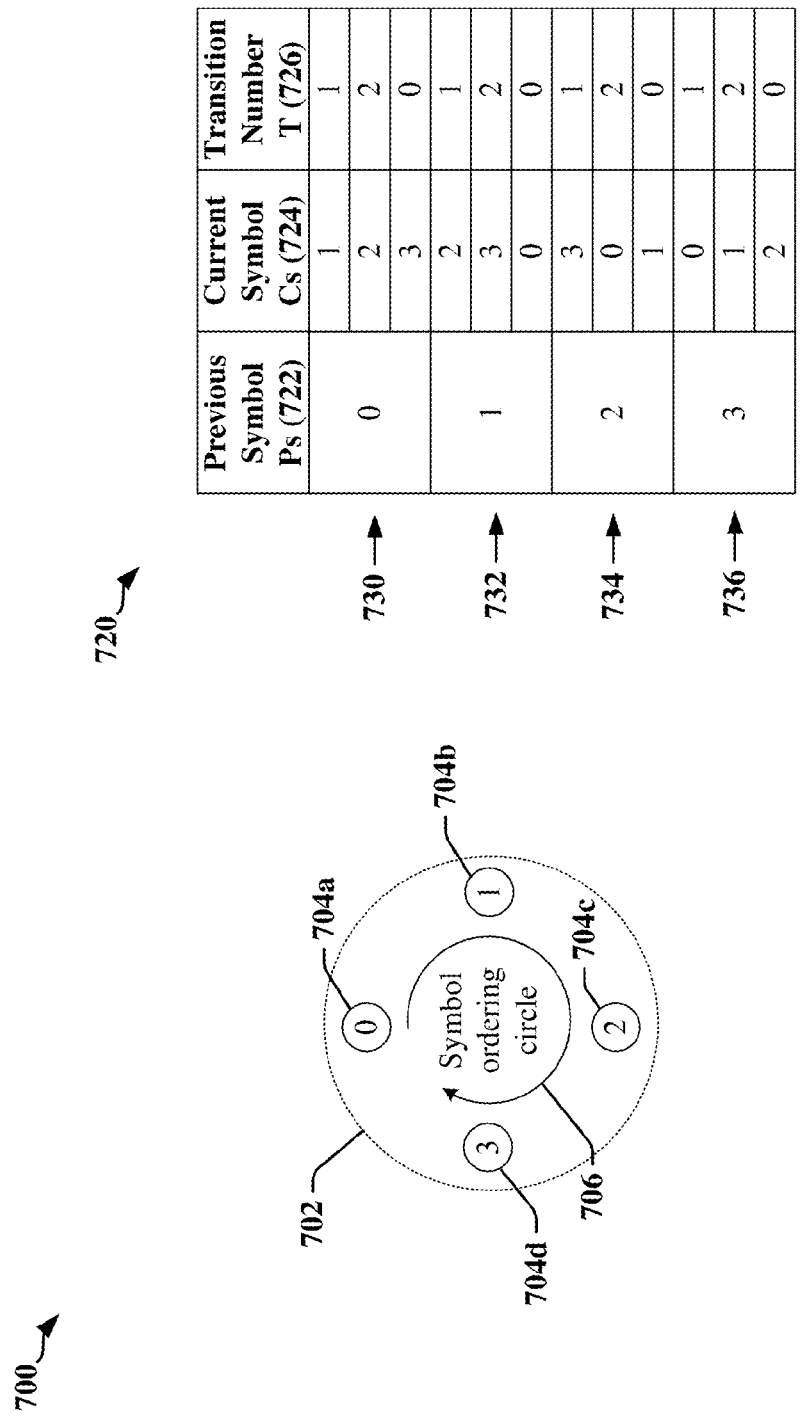
FIG. 7 illustrates an encoding scheme for transcoding data according to certain aspects disclosed herein.

FIG. 7 is a drawing illustrating an encoding scheme 700 that may be used by the encoder 604 to produce a sequence of symbols 614 with embedded clock information for transmission on the CCIe bus 330. The encoding scheme 700 may also be used by a decoder 624 to extract ternary transition numbers from symbols 634 received from the CCIe bus 330. In the CCIe encoding scheme 700, the two wires 316, 318 of the CCIe bus 330 permit definition of 4 basic symbols S: {0, 1, 2, 3}. Any two consecutive symbols in the sequence of symbols 614, 634 have different states, and the symbol sequences {0, 0}, {1, 1}, {2, 2} and {3, 3} are invalid combinations of consecutive symbols. Accordingly, only 3 valid symbol transitions are available at each symbol boundary, where the symbol boundary is determined by the transmit clock and represents the point at which a first symbol (previous symbol Ps) 722 terminates and a second symbol (current symbol Cs) 724 begins.

According to certain aspects disclosed herein, the three available transitions are assigned a transition number (T) 726 for each Ps symbol 722. The value of T 726 can be represented by a ternary number. In one example, the value of transition number 726 is determined by assigning a symbol ordering circle 702 for the encoding scheme. The symbol ordering circle 702 allocates locations 704a-704d on the circle 702 for the four possible symbols, and a direction of rotation 706 between the locations 704a-704d. In the depicted example, the direction of rotation 706 is clockwise. The transition number 726 may represent the separation between the valid current symbols 724 and the immediately preceding symbol 722. Separation may be defined as the number of steps along the direction of rotation 706 on the symbol ordering circle 702 required to reach the current symbol Cs 724 from the previous symbol 722. The number of steps can be expressed as a single digit base-3 number. It will be appreciated that a three-step difference between symbols can be represented as a $0_{base-3}$. The table 720 in FIG. 7 summarizes an encoding scheme employing this approach.

At the transmitter 600, the table 720 may be used to lookup a current symbol 724 to be transmitted, given knowledge of the previously generated symbol 722 and an input ternary number, which is used as a transition number 726. At the receiver 620, the table 720 may be used as a lookup to determine a transition number 726 that represents the transition between the previously received symbol 722 and the currently received symbol 724. The transition number 726 may be output as a ternary number.

With continued reference to FIGS. 5-7, multiple bits of data 610 may be encoded in a sequence of symbols 614 for transmission in a single transmission interval 506, 508 on a serial bus 330. In one example, 20 bits of data 610 may be encoded in a sequence of 12 symbols 614, 502, 504 preceded by a two-symbol start condition 516, 518. The content of the payload of each sequence of 12 symbols 502, 504 may be determined and/or controlled by a CCIe protocol, which may define types of transmission and control mechanisms for ensuring reliable communication over the serial bus 330.

Figure 8:
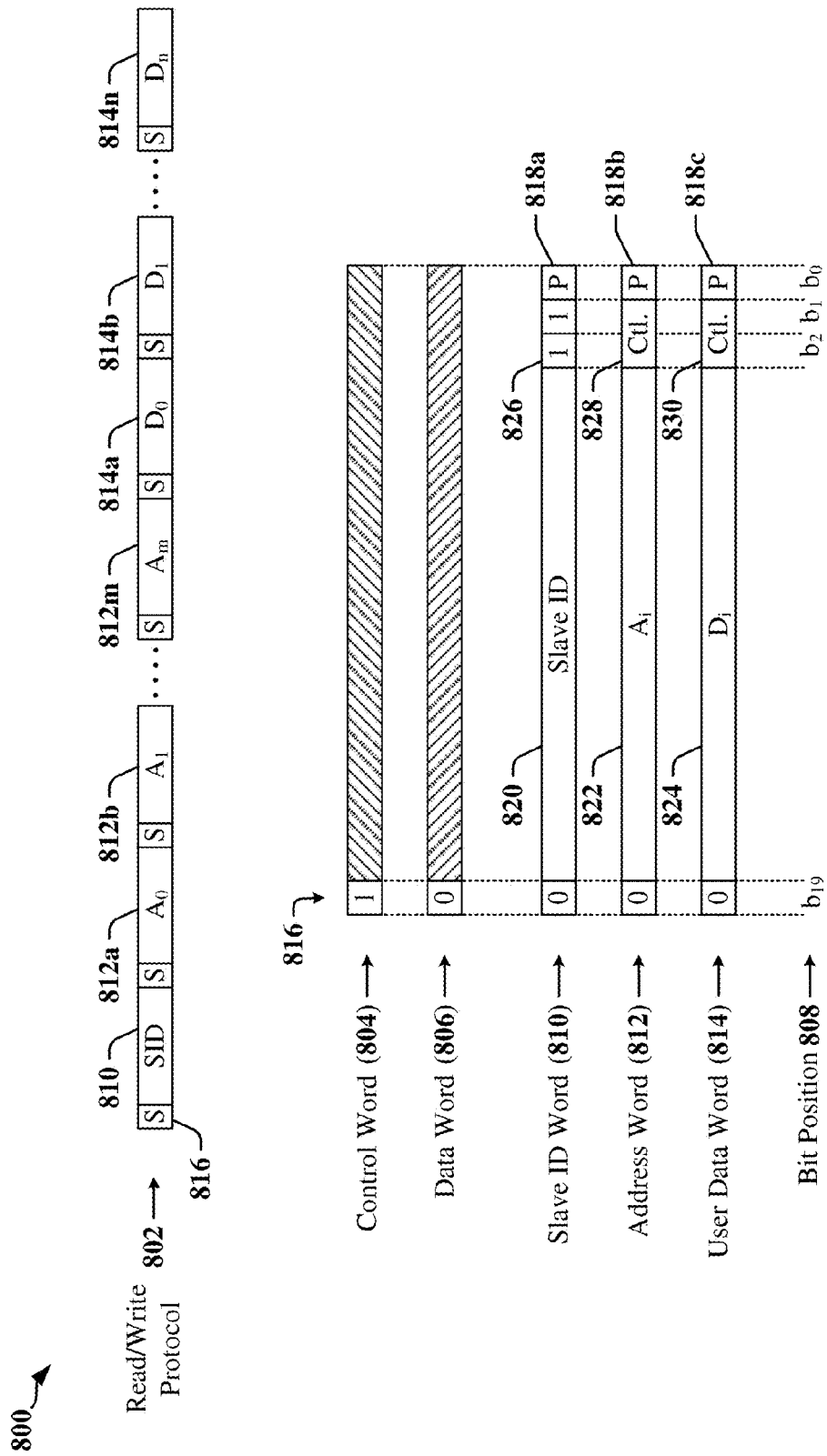
FIG. 8 illustrates certain aspects of a CCIe protocol.

FIG. 8 is a simplified illustration of certain aspects of a CCIe protocol. The 20-bit element encoded in transmission symbols 502, 504 may be identified as including control information or data. The first transmitted bit ($b_{19}$) 816 of the 20 bits encoded in 12 transmission symbols 502, 504 may be set to binary '1' when control information 804 is being transmitted, and to binary '0' when an encoded user data word 814 is being transmitted in the 12 transmission symbols 502, 504. Control information may include commands, status, register content and/or settings, and other information used to control and order communication between devices. The term user data may refer to 16-bit fields 824 of information that are defined based on an application or context. Different types of data words 810, 812, 814 may be defined and these data words 810, 812, 814 may include information such as a slave address or identifier 820, an address or portion of an address 822, or application data 824 to be read from or written to a previously identified memory address in a previously-identified slave node.

In the simplified example 800 illustrated in FIG. 8, a master device 320 on a CCIe serial bus 330 may perform a read or write operation from or to a slave node 302, 322a-322n by sending a slave identifier 810 in one or more transmissions, an address transmitted in one or more address words 812a, 812b, . . . 812m identifying the location to be read or written in one or more address transmissions 812, and the read/write user or application data may be transmitted in one or more user data transmission words 814a, 814b, . . . 814n.

In some instances, the slave ID word 810 includes a 16-bit node identifier 820, providing 65,536 possible addresses. A two-bit field 826 transmitted after the slave ID 820 may be set to binary '11' (decimal '3'). An additional protocol-defined (P) bit 818*a* may be provided to support error detection, or other protocol-related function. In one example, the P bit 818*a* may be a parity bit or another error detection value for the current word. In another example, the P bits 818*a* in a sequence of words may be used for error detection and/or correction for the sequence of words.

In some instances, each address word 812 includes a 16-bit address value, a 2-bit control code 828, and an additional protocol-defined (P) bit 818*b*. Multiple address words 812*a*, 812*b*, . . . 812*m* may be transmitted sequentially. An example of bit settings for the control code 828 is provided in Table 1. In the example illustrated, the control code 828 may be set to '00' to indicate that another address word 812*b*, . . . 812*m* is to be transmitted after the current address word 812*a*, 812*b*. The control code 828 may be set to '01' to indicate that a data word is to be transmitted as the next data word 814*a*. The control code 828 may be set to '10' to indicate that a data word is to be read as the next data word 814*a* on the CCIe serial bus 330. The control code 828 may be set to '11' to indicate that a "read specification" word 812*b*, . . . 812*m* follows to define a number of words to be read in a burst mode.

TABLE 1

Address Word Control

| B[2:1] | Symbol | Description |
|---|---|---|
| 00 | C | Continue to next address word |
| 01 | W | Write |
| 10 | R1 | Read one word |
| 11 | RB | Read (burst) |

In some instances, each user data word 814 includes a 16-bit data value 824, a 2-bit control code 830, and an additional protocol-defined (P) bit 818*c*. Multiple user data words 814*a*, 814*b*, . . . 814*n* may be transmitted sequentially. An example of bit settings for control code 830 relating to write data is provided in Table 2. Examples of bit settings for the control code 830 relating to read data is provided in Table 3 and relating to burst read data is provided in Table 4.

TABLE 2

Write Data Word Control

| B[2:1] | Symbol | Description |
|---|---|---|
| 00 | C0 | Write to current address |
| 01 | C1 | Write to current address +1 |
| 10 | C2 | Write to current address +2 |
| 11 | E | End Write |

Multiple write data words can be sent sequentially. In Table 2, the value of the control code 830 provides an offset value for writing the next user data word 814*b*, . . . 814*n*. For example, a value ranging from binary '00' to binary '10' indicates that another write data word 814*b*, . . . 814*n* is to be written at the current location offset by the value of the control code 830. A control code 830 set to binary '11' indicates that the current write data word 814*a*, 814*b*, . . . 814*n* is the last data 824 to be written. The next word expected may be a Slave ID word 810 to initiate a new transaction, or a control word 804 such as an "Exit" code word that may, for example, cause a change in master device on the serial bus 330, cause the serial bus 330 to enter an inactive state, initiate a change in mode of operation of the serial bus 330 (e.g. to I2C mode), or cause some other activity, change or event.

TABLE 3

Read Data Word Control

| B[2:1] | Symbol | Description |
|---|---|---|
| 00 | C | CRC |
| 01 | — | Reserved |
| 10 | — | Reserved |
| 11 | E | No CRC |

Table 3 relates to single data word 814 reads (see R1 in Table 1) in which only one read data word 814 is transmitted. The control code 830 may be used to determine whether a CRC is transmitted in the next data word 814. For example, the control code 830 may be set to binary '11' if no CRC word 814 is to be transmitted after the current data word 814, and set to '00' if a CRC word 814 is to be transmitted after the current data word 814.

TABLE 4

Burst Read Data Control

| B[2:1] | Symbol | Description |
|---|---|---|
| 00 | C | Continue |
| 01 | — | Reserved |
| 10 | — | Reserved |
| 11 | E | Last read word |

Table 4 relates to burst-mode reads of multiple data words 814 (see RB in Table 1). The control code 828 of an address word 812 may indicate that a "read specification" word follows the address word 812. The "read specification" word may include a 16-bit field, whereby the t=first transmitted bit ($b_{18}$) is set to binary '1' when an unlimited number of bits are to be read, and set to '0' when the remaining 15 bits ($b_{17}$-$b_3$) specify the number of data words 814 to be transmitted. A read data word 814 transmitted in RB mode may include a 16-bit read data value 824, a 2-bit control code 830, and an additional protocol-defined (P) bit 818*c*. The control code 830 of the read data word may be set to '11' to indicate that the current read data word 814*a*, 814*b*, . . . 814*n* is the last read data word 814, and set to binary '00' to indicate that the current read data word 814*a*, 814*b*, . . . 814*n* is not the last read data word 814.

The protocol may prohibit the slave node from sending more data words 814 (not including CRC words) than specified by the "read specification" word. The protocol may specify that the slave node send at least one read word 814 (not including CRC word). The slave node may end read transfers before transmitting the number of words specified by the "read specification" word.

Devices with Multiple Imaging Devices or Other Peripherals

In some instances, more than one imaging device may be provided in an apparatus. In one example, a mobile communications device may provide cameras on two sides of the device to enable a user to independently capture forward facing images and backwards facing images. In another example, a mobile communications device, a video camera or the like may provide two or more imaging devices or cameras spaced apart on the same or different surfaces to enable capture of stereoscopic or three-dimensional (3-D) images. In the latter example, the two or more cameras may be operated concurrently, where it may be desirable or required that a baseband processor of the apparatus can transmit certain command and control information identically and concurrently or simultaneously to both imaging devices.

FIG. 9 is a block schematic diagram illustrating certain aspects of an apparatus 900 that includes two imaging devices 902, 922, that each have an image sensor and/or sensor controller 904, 924, where the devices 902 922 are coupled as slaves to a serial bus 330. The apparatus 900 may be embodied in one or more of a wireless mobile device, a mobile telephone, a camera, a mobile computing system, a wireless telephone, a notebook computer, a tablet computing device, a media player, a gaming device, a wearable computing device, an appliance, or the like. The apparatus 900 may include other slave devices (not shown) and a baseband processor 920 that serves as a CCI or CCIe master node on the serial bus 330. The apparatus may implement a 3-D or stereoscopic camera system with a left camera and a right camera providing separate views that are used to create a single 3-D image when combined. Each camera may be embodied in, or controlled by a slave device 902, 922 and may be coupled to the master node (baseband processor 920) via the serial bus 330, which may be operated as a CCI bus or CCIe bus. For ease of manufacturing and, both cameras may be identical to each other and may have the same slave device identifier (SID). As used herein the terms "slave device identifier" and "slave device identification" are interchangeable because the slave device identification is the slave device identifier, and the acronym SID refers to both.

The imaging devices 902, 922 may include sensor control modules 904, 924 that include, are coupled to, and/or manage respective image sensors. In addition, the imaging devices 902, 922 may include configuration registers 906, 926 and/or other storage devices 908, 928, processing circuits and/or control logic 912, 932, and transceivers 910, 930. Each of the processing circuits and/or control logic 912, 932 may include a processor such as a state machine, sequencer, signal processor, special-purpose processor, or general-purpose processor. The transceivers 910, 930 may include or control encoders, decoders, line drivers, line receivers, timing circuits, logic and storage circuits clock and data recovery circuits, and/or other devices.

In the example of a 3-D or stereoscopic camera configuration, it may be desirable to communicate certain command and control information concurrently or simultaneously to the imaging devices 902, 922, while retaining the capability of communicating individually with the component imaging devices 902, 922. For example, camera operations may be coordinated between the imaging devices 902, 922 such that shutter release, aperture settings and other aspects of camera operations may be initiated by the baseband processor 920 and executed concurrently or simultaneously by the imaging devices 902, 922.

FIG. 10 illustrates three examples of camera configurations 1000, 1020, 1040. In each configuration 1000, 1020, 1040, a baseband processor 1002, 1022, 1042 communicates with a respective pair of cameras or imaging devices 1004/1006, 1024/1026, 1044/1046 using one or more serial bus 1008, 1028, 1030, 1048, 1050, 1052 that may be operated according to CCI protocols or CCIe protocols.

In the first configuration 1000, a camera system has a left camera 1004 and a right camera 1006 configured to provide separate views that are used to create a single 3-D image when combined. In some instances, and for ease of manufacturing, both cameras 1004, 1006 may be identical to one another and may be provided with the same SID. Simultaneous communication of commands and control information may be facilitated through the assignment of the same SID to both imaging devices 1004, 1006. When both imaging devices 1004, 1006 have the same SID, the baseband processor 1002 can issue a command that may be received and executed by the imaging devices 1004, 1006 concurrently or simultaneously. For example, a "Shutter release" command may be executed by imaging devices 1004, 1006 within a few clock cycles. Assignment of the same SID to both imaging devices 1004, 1006 typically precludes protocol-defined read operations and certain write operations. A read command issued by the baseband processor 1002 to the shared SID may result in both imaging devices 1004, 1006 transmitting simultaneously, causing a collision or interference to occur on the serial bus 1008.

In one example, both cameras 1004, 1006 may have an SID=X. A collision may occur when both cameras 1004, 1006 in a conventional system respond to a request for data transmitted by the master node (baseband processor 1002) on the serial bus 1008 and directed to the device with the SID=X. In addition to read data transmitted by the cameras 1004, 1006, the acknowledgement and/or negative acknowledgement (i.e., ACK/NACK) bit of each write data byte may also collide. Accordingly, the first configuration 1000 tends to be impractical and operationally limited when used in a conventional system.

In the second configuration 1020, a camera system has a left camera 1024 and a right camera 1026 configured to provide separate views that are used to create a single 3-D image when combined. A pair of separate serial buses 1028, 1030 may be used to couple the baseband processor 1022 to the cameras 1024, 1026. The baseband processor 1002 can issue a command simultaneously on the serial buses 1028, 1030, such that the command is received and executed by the cameras 1004, 1006 simultaneously or concurrently. In instances where both cameras 1024, 1026 are identical to one another and have been provided with the same SID, the cameras 1004, 1006 may be operated with the identical SIDs without causing collisions.

The use of multiple serial buses may result in increased hardware and software complexity. The baseband processor 1022 in the second configuration 1020 includes and operates at least two serial interfaces, with associated cost in hardware complexity and processing time needed to handle communications. Certain tradeoffs may be required. For example, it may be advantageous from a hardware complexity perspective to support additional devices on the serial buses 1028 and 1030. When other devices are supported, it is possible that a different master may have control of one of the buses 1028, 1030 when a command is to be sent to the cameras 1024, 1026. Accordingly, the baseband processor 1022 may require more sophisticated resource management processes to ensure commands are transmitted simultaneously. That is to say, the baseband processor 1022 may generate a command, determine the availability of the serial buses 1028, 1030, retain control of any available bus 1028, 1030 and wait for any remaining bus to become available. These synchronization processes may affect throughput and latency of the serial buses 1028, 1030. The additional physical input/output requirements (i.e. pins, leads, bumps, pads, etc.) for the broadband processor 1022, duplicated master logic on the broadband processor 1022, and duplicated bus wiring on a circuit board may increase the cost and complexity of the camera system.

In the third configuration 1040, a camera system has a left camera 1044 and a right camera 1046 configured to provide separate views that are used to create a single 3-D image when combined. A primary serial bus 1048 is used by the baseband processor 1042 for communicating with the cameras 1044, 1046. A traffic control device 1054 may be provided to selectively connect the primary serial bus 1048 to separate serial bus segments 1050, 1052 to which the cameras 1044, 1046 are connected. The traffic control device 1054 may be implemented as a bridge, a switch, a router or some combination thereof. One or more signals 1056 provided by the baseband processor 1042 may select the mode of connection between the primary serial bus 1048 to separate serial bus segments 1050, 1052.

The third configuration 1040 facilitates simultaneous communication of commands and control information through the assignment of the same SID to both imaging devices 1044, 1046. When both imaging devices 1044, 1046 have the same SID, the baseband processor 1042 may operate the traffic control device 1054 to couple both serial bus segments 1050, 1052 to the primary serial bus 1048, and the baseband processor 1042 may then issue a command that is received and executed by the imaging devices 1044, 1046 simultaneously or concurrently. When sending a read command, the baseband processor 1042 may operate the traffic control device 1054 to cause one of the serial bus segments 1050, 1052 to be coupled to the primary serial bus 1048, while the other bus segment 1052, 1050 is disconnected.

The traffic control device 1054 may include complex logic, and additional control logic may be provided in the baseband processor 1042 to support the operation of the traffic control device 1054. The baseband processor 1042 may be subject to higher processing overheads in order to implement the third configuration 1040. In one example, the traffic control device 1054 may employ additional logic that combines ACK/NACK bits transmitted by the imaging devices 1044, 1046. In another example, the traffic control device 1054 may employ additional logic and/or circuits that manage the signaling state of a serial bus segment 1050, 1052 that is disconnected while the other bus segment 1052, 1050 is coupled to the primary serial bus 1048. While the third configuration 1040 may avoid collisions and facilitate simultaneous communication of commands and control information, the master node or device (in the example, the baseband processor 1042) requires an additional pin, an additional device (in the example, the traffic control device 1054), and additional bus wiring on the circuit board.

Communication Over a Serial Bus Using Multiple SIDs

According to certain aspects disclosed herein, CCI or CCIe slave devices may be assigned multiple SIDs. A CCI or CCIe slave device may be adapted to respond to commands directed to any of a plurality of SIDs assigned to the slave device. A master node may be adapted to manage SID assignments where certain slave devices have been assigned multiple addresses. The master device may selectively address one or more slave devices individually, or as a group. In one example, the master node may determine whether a command is to be simultaneously directed to two cameras in a 3-D camera system and may transmit such command using an SID shared by both cameras.

Certain aspects of the disclosure are now described in relation to a serial bus interface that is operated in accordance with CCIe protocols. These aspects can also generally be applied to serial bus interfaces that operate according to CCI protocols, although certain adjustments and/or compromises may be made when adapting slave devices to enable such devices to respond to multiple SIDs in a CCI mode of operation. For example, the ACK/NACK protocol employed in CCI interfaces can result in collisions when an I2C/CCI write operation is performed to an SID address that is shared by two or slave devices. In some instances, the master device may ignore a NACK response from a first slave device if a second slave device transmits an ACK in response to the same write command.

FIGS. 11-13 illustrate the operation of a CCIe bus 1108 in which a left camera 1104 and a right camera 1106 have been adapted to maintain and respond to multiple SIDs that have been assigned or configured for the cameras 1104, 1106. A baseband processor 1102 serves as a master node and, in a first mode of operation, can transmit and receive commands or data to both slave devices 1104, 1106 through the CCIe bus 1108 without using additional devices and/or bus wiring on the circuit board. In a second mode of operation the baseband processor 1102 can communicate with each of the slave devices 1104, 1106 individually, such that the slave devices 1104, 1106 may transmit data and other information on the CCIe bus 1108 with an expectation of no collisions under normal circumstances.

Both cameras 1104, 1106 share a common SID and individually maintain unique SIDs. A first camera 1104 may be configured to respond to a common SID (SID=X) and a first unique SID (SID=Y). A second camera 1106 may be configured to respond to the common SID (SID=X) and a second unique SID (SID=Z). The unique SIDs assigned to the cameras 1104, 1106 serve as individualized identifiers. In one example, the first camera 1104 may be deployed as a left-side camera in a 3-D camera system, while the second camera 1106 may be deployed as a right-side camera in the 3-D camera system.

Although shown with only one unique address and one common address, other combinations may be implemented. For example, the cameras 1104, 1106 may have a common SID, and two or more unique SIDs. Additionally, slave devices (not shown) other than cameras 1104, 1106 may be provided with a plurality of SIDs. Slave devices may be grouped according to functionality. For example, all slave devices may have a single common SID (e.g., SID0=X), each slave device may have a unique SID, and groups of slave devices that perform a similar function may have a group ID corresponding to the common function. In one example, all camera devices 1104, 1106 may have a group SID=W, and all acoustic sensor slave devices may have a group SID=Q. That is, the master device (baseband processor 1102) may send a write addressed to SID=W that cause all camera slave devices to respond. An acoustical sensor may be an audible sensor capable of sensing sound within a human's range of hearing and/or at ultrasonic frequencies.

FIG. 11 relates to an example 1100 in which the baseband processor 1102 causes the CCIe bus 1108 to operate according to the first mode of operation. In this mode, the baseband processor 1102 effectively broadcasts to both cameras 1104, 1106 by addressing commands and data to the common SID (SID=X). In the first mode of operation, the baseband processor 1102 may write data to both slave devices 1104, 1106 or transmit a command that does not require a response from a target slave device 1104, 1106. Collisions do not occur in CCIe exchanges because CCIe does not use ACK/NACK communication in the CCIe write word format. Accordingly, neither camera 1104, 1106 acknowledges receipt of the command or written data and no data collision ensues. FIG. 11 relates to an example of two slave devices 1104, 1106, although more than two slave devices 1104, 1106 can share a common SID. Each slave device 1104, 1106 may also maintain or respond to more than one common SID, permitting configurations of overlapping groups of slave devices 1104, 1106 without impairing the flexibility of operation of a CCIe bus 1108. The CCIe protocol provides an address space that includes 65,536 potential SIDs. It will be appreciated that the I2C/CCI protocol provides a limited address space of 128 SIDs.

FIG. 12 relates to an example 1200 in which the baseband processor 1102 causes the CCIe bus 1108 to operate according to the second mode of operation. In this example 1200, the baseband processor 1102 preforms an individual write to the left camera 1104. The baseband processor 1102 selects the left camera 1104 for the write operation by addressing the left camera 1104 using the first unique SID (Y), which is assigned solely to the left camera 1104.

FIG. 13 relates to an example 1300 in which the baseband processor 1102 causes the CCIe bus 1108 to operate according to the second mode of operation. In this example 1200, the baseband processor 1102 preforms a read from the right camera 1106. The baseband processor 1102 selects the right camera 1106 for the write operation by addressing the right camera 1106 using the second unique SID (Z), which is assigned solely to the right camera 1106.

FIG. 14 is a block schematic diagram 1400 illustrating certain aspects of a CCIe master node 1402 that is adapted to support multiple SIDs for slave devices. The master node 1402 may be embodied in one or more of a wireless mobile device, a mobile telephone, a camera, a mobile computing system, a wireless telephone, a notebook computer, a tablet computing device, a media player, a gaming device, a wearable computing device, an appliance, or the like. In one example, the master node 1402 may be configured to manage a 3-D or stereoscopic camera system, where each camera is embodied in, or controlled by a different slave device 902, 922 coupled to the master node 1402 through a CCIe bus.

The master node 1402 may include a processing circuit and/or control logic 1404, one or more storage devices 1406, a database manager or list manager 1408, a protocol module 1410 and a transceiver 1412. The processing circuit and/or control logic 1404 may include a processor such as a state machine, sequencer, signal processor or general-purpose processor. The transceiver 1412 may include or control encoders, decoders, line drivers, line receivers, timing circuits, logic and storage circuits clock and data recovery circuits, and/or other devices.

The master node 1402 may use the list manager 1408 to maintain an SID listing 1420 associating SIDs with known or identified slave devices that are coupled to the CCIe bus, including a listing of slave devices that maintain or respond to multiple SIDs. The master node 1402 may maintain an SID listing 1420 that includes at least one unique identifier for each slave device. The CCIe protocol supports a multi-master environment in which multiple master nodes 1402 may serially control the CCIe bus. An inactive master device that wishes to take control of the CCIe bus may send the current master node 1402 a request for control of the CCIe bus. The request is sent by the inactive master device while it is operated in slave mode, since only one master can control the CCIe bus at any time. The active master node 1402 may transfer the SID listing 1420 to the inactive master during, before or after initiating handover of the master role on the CCIe bus.

The current master node 1402 may maintain the SID listing 1420 in a database, list, table or some other data structure. The SID listing 1420 may set forth at least one SID for each slave device known to the master node 1402. In some instances, a master node 1402 may maintain an SID listing 1420 that includes SIDs for identified slave devices that the master node 1402 accesses or has accessed. In the latter example, the SID listing 1420 may not include SIDs for all slave devices coupled to the CCIe bus. In one example, a plurality of master devices 1402 in a multi-master environment may each have cause to access only a small subset of all of the slave devices coupled to the CCIe bus and, the master nodes 1402 may know or need to know the SIDs of a subset of slave devices.

SIDs of a slave device may be fixed, programmable or some combination thereof. In one example, each slave device may be provided with a factory-configured SID (SID0) 1422a, which may be preset and not adjustable, and the slave device may be configurable to maintain or respond to other configurable SIDs (SID1, SID2, . . . SIDn) 1422b-1422n. Configurable SIDs 1422b-1422n may be configured through software programming or by hardware manipulation using, for example, external pins or jumpers on the slave devices. The Institute of Electrical and Electronic Engineers (IEEE) publishes a standard (the IEEE 1149.1 standard) that may be used to assign SIDs in some slave devices. In some instances, a slave device may include an eFUSE compliant programmable component. In some instances, the slave devices may include a field programmable gate array (FPGA) or other programmable logic component that can be programmed to store and use at least one SID.

The SID listing 1420 may have, or be able to accommodate a plurality of devices, which are numbered 1-m in the diagram 1400. In a first example, the SID listing 1420 may identify a first device (Device 1) produced by a manufacturer and configured with a plurality of SIDs that includes a group or common SID (SID=X) and at least one secondary SID (SID=Y). The SID listing 1420 may identify a second device (Device 2) produced by the same manufacturer and configured with a plurality of SIDs that includes the group or common SID (SID=X) and at least one secondary SID (SID=Z). In one example, all devices of a particular type and/or model may be configured with the group or common SID=X and the manufacturer may further configure a first batch of slave devices with a secondary SID=Y in addition to the group or common SID (SID=X), and the manufacturer may configure a second batch of slave devices with a secondary SID=Z in addition to the group or common SID=X. The ability to distinguish between slave devices from two batches may facilitate the inclusion of exactly two slave devices of the same type in an apparatus. In other words, a pair of slave devices including one device from each of two batches are identical except that their respective SID1s 1422b have different values. The manufacturer may produce other batches of the slave device with different secondary addresses that enables more than two slave devices of the same type to be coupled to a serial bus.

In a second example, a slave device manufacturer may produce slave devices with no fixed SIDs. Each slave device may be configured when the slave device is integrated in an apparatus and/or after being coupled to a serial bus.

One or more of the SIDs configured in a slave device may be group IDs. For example, if a slave device has mixed functionality such that it falls into two separate functional group definitions, then that slave device may be part of both groups. In the illustrated SID listing 1420, each of devices 1-4 may be configured with a common SID (SID=X) maintained as the SID0 1422a for these devices, and the devices 1-4 may be configured with different secondary SIDs identified as the SID1 1422b for these devices. For example, the SID listing 1420 may include the common SID (SID=X) as an SID0 entry 1422a for device 1 and a unique SID (SID=Y) as an SID1 entry 1422b for device 1, and the SID listing 1420 may include the common SID (SID=X) as an SID0 entry 1422a for device 2 and a unique SID (SID=Z) as an SID1 entry 1422b for device 2 (see also, FIG. 11). In this example, the SID listing 1420 includes a unique SID (SID=A) as the SID1 entry 1422b for device 3 and an SID (SID=B) as the SID1 entry 1422b for device 4, while both device 3 and device 4 are configured with common SID (SID=X), and are therefore members of a common group with device 1 and device 2. The SID listing 1420 includes a group SID (SID=C) as SID2 entries 1422c for device 1 and device 2 and a group SID (SID=D) as SID2 entries 1422c for device 3 and device 4. Accordingly, each of devices 1-4 may belong to two different groups.

In the illustrated SID listing 1420, device 5 is identified as belonging to a third group that also includes device 6 through the presence of the group SID (SID=G) as the SID2 entry 1422c for device 5 and device 6.

In the illustrated SID listing 1420, device 7 is not identified as a member of any group, although two SID assignments are recorded for this device. Device 8 is illustrated as having a single SID (SID=R) assignment recorded in the SID1 entry 1422b, which may indicate that device 8 is capable of responding to communications directed to multiple SIDs and/or that another SID has been assigned for device 8 but has been subsequently deleted or is otherwise unavailable for the use of the master device 1402. Device 9 has a single SID (SID=T) maintained as the SID0 entry 1422a for device 9, and device 9 may be a conventional slave device that has not been adapted or configured to respond to communications directed to multiple SIDs.

The last device (device m) in the illustrated SID listing 1420 includes an SID0 entry 1422a (SID=M). In some examples, the SID listing 1420 may have an adjustable length sufficient to maintain SID information for the number slave devices known to the master node 1402. That is, device m may be the last entry in an SID listing 1420 that has a length which may be increased when a new slave device is discovered by the master node 1402. In other examples, the master node 1402 may maintain a preconfigured, fixed length SID listing 1420 that may be fully or partially filled in operation. In some instances, there may be no entries for devices numbered 10 through m−1 (not shown) in the SID listing 1420. In other instances, less than all of the devices numbered 10 through m−1 may have one or more SIDs configured in the SID listing 1420.

The SID listing 1420 may include entries for devices that have no assigned or identified SIDs. Additionally, because different slave devices may have different capacities for SIDs the SID listing 1420 may include and/or be associated with information regarding the SID storage capacities and/or capabilities of slave devices identified in the SID listing 1420. In one example, some slave devices may be assigned only two different SIDs, while another slave device may have the capacity to hold and respond to 128 SIDs. This capacity information may be included in the SID listing 1420, or in an associated list or table that can be transferred to a new master device as part of a master handover protocol. In another example, a CCIe master device 1402 may be configured to operate as CCI bus master and the SID listing 1420 or associated information may identify CCIe SIDs and CCI SIDs for one or more slave devices.

Example of a Processing Circuit

FIG. 15 is a conceptual diagram 1500 illustrating a simplified example of a hardware implementation for an apparatus employing a processing circuit 1502 that may be configured to perform one or more functions disclosed herein. For example, the processing circuit may be deployed as the processing circuit 102 of FIG. 1, at least a portion of the device 202 or the device 230 of FIG. 2, the processing circuit 312 of FIG. 3, etc. In accordance with various aspects of the disclosure, an element, or any portion of an element, or any combination of elements as disclosed herein may be implemented using the processing circuit 1502. The processing circuit 1502 may include one or more processors 1504 that are controlled by some combination of hardware and software modules. Examples of processors 1504 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1504 may include specialized processors that perform specific functions, and that may be configured, augmented or controlled by one of the software modules 1516. The one or more processors 1504 may be configured through a combination of software modules 1516 loaded during initialization, and further configured by loading or unloading one or more software modules 1516 during operation.

In the illustrated example, the processing circuit 1502 may be implemented with a bus architecture, represented generally by the bus 1510. The bus 1510 may include any number of interconnecting buses and bridges depending on the specific application of the processing circuit 1502 and the overall design constraints. The bus 1510 links together various circuits including the one or more processors 1504, and storage 1506. Storage 1506 may include memory devices and mass storage devices, and may be referred to herein as computer-readable media and/or processor-readable media. The bus 1510 may also link various other circuits such as timing sources, timers, peripherals, voltage regulators, and power management circuits. A bus interface 1508 may provide an interface between the bus 1510 and one or more transceivers 1512. A transceiver 1512 may be provided for each networking technology supported by the processing circuit. In some instances, multiple networking technologies may share some or all of the circuitry or processing modules found in a transceiver 1512. Each transceiver 1512 provides a means for communicating with various other apparatus over a transmission medium. Depending upon the nature of the apparatus, a user interface 1518 (e.g., keypad, display, speaker, microphone, joystick) may also be provided, and may be communicatively coupled to the bus 1510 directly or through the bus interface 1508.

A processor 1504 may be responsible for managing the bus 1510 and for general processing that may include the execution of software stored in a computer-readable medium that may include the storage 1506. In this respect, the processing circuit 1502, including the processor 1504, may be used to implement any of the methods, functions and techniques disclosed herein. The storage 1506 may be used for storing data that is manipulated by the processor 1504 when executing software, and the software may be configured to implement any one of the methods disclosed herein.

One or more processors 1504 in the processing circuit 1502 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1506 or in an external computer readable medium. The external computer-readable medium and/or storage 1506 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1506 may also include, by way of example, a carrier wave, a transmission line, and any other suitable medium for transmitting software and/or instructions that may be accessed and read by a computer. Computer-readable medium and/or the storage 1506 may reside in the processing circuit 1502, in the processor 1504, external to the processing circuit 1502, or be distributed across multiple entities including the processing circuit 1502. The computer-readable medium and/or storage 1506 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1506 may maintain software maintained and/or organized in loadable code segments, modules, applications, programs, etc., which may be referred to herein as software modules 1516. Each of the software modules 1516 may include instructions and data that, when installed or loaded on the processing circuit 1502 and executed by the one or more processors 1504, contribute to a run-time image 1514 that controls the operation of the one or more processors 1504. When executed, certain instructions may cause the processing circuit 1502 to perform functions in accordance with certain methods, algorithms and processes described herein.

Some of the software modules 1516 may be loaded during initialization of the processing circuit 1502, and these software modules 1516 may configure the processing circuit 1502 to enable performance of the various functions disclosed herein. For example, some software modules 1516 may configure internal devices and/or logic circuits 1522 of the processor 1504, and may manage access to external devices such as the transceiver 1512, the bus interface 1508, the user interface 1518, timers, mathematical coprocessors, and so on. The software modules 1516 may include a control program and/or an operating system that interacts with interrupt handlers and device drivers, and that controls access to various resources provided by the processing circuit 1502. The resources may include memory, processing time, access to the transceiver 1512, the user interface 1518, and so on.

One or more processors 1504 of the processing circuit 1502 may be multifunctional, whereby some of the software modules 1516 are loaded and configured to perform different functions or different instances of the same function. The one or more processors 1504 may additionally be adapted to manage background tasks initiated in response to inputs from the user interface 1518, the transceiver 1512, and device drivers, for example. To support the performance of multiple functions, the one or more processors 1504 may be configured to provide a multitasking environment, whereby each of a plurality of functions is implemented as a set of tasks serviced by the one or more processors 1504 as needed or desired. In one example, the multitasking environment may be implemented using a timesharing program 1520 that passes control of a processor 1504 between different tasks, whereby each task returns control of the one or more processors 1504 to the timesharing program 1520 upon completion of any outstanding operations and/or in response to an input such as an interrupt. When a task has control of the one or more processors 1504, the processing circuit is effectively specialized for the purposes addressed by the function associated with the controlling task. The timesharing program 1520 may include an operating system, a main loop that transfers control on a round-robin basis, a function that allocates control of the one or more processors 1504 in accordance with a prioritization of the functions, and/or an interrupt driven main loop that responds to external events by providing control of the one or more processors 1504 to a handling function.

Other Examples Related to Communications Involving Multi-SID Slave Devices

FIG. 16 conceptually illustrates a method 1600 used to operate a CCIe bus when slave devices having multiple SID are coupled to the bus.

At block 1602, an address list may be maintained, where the address list associates each of a plurality of slave devices coupled to a control data bus with a plurality of slave device identifiers. The control data bus may include a CCIe, CCI, or I2C bus.

At block 1604, access to the control data bus may be controlled based on the address list.

At block 1606, it may be determined which mode of a plurality of modes of operation is to be employed for a transmission. In one example, a first mode of operation is to be employed and the method continues at block 1608. In another example, a second mode of operation is to be employed and the method continues at block 1610.

At block 1606, and in a first mode of operating the control data bus, concurrent communications may occur with a first slave device and a second slave device using a first group slave device identifier that is associated with the first slave device and the second slave device.

At block 1606, and in a second mode of operating the control data bus, individual communications may occur with the first slave device using a unique slave device identifier that is associated with the first slave device and is not associated with the second slave device.

In one example, a first write message may be broadcast or otherwise transmitted concurrently to a first plurality of slave devices using the first group slave device identifier, and a second write message may be broadcast or otherwise transmitted concurrently to a second plurality of slave devices using a second group slave device identifier.

In another example, a read command may be addressed to the first slave device using the unique slave device identifier, and data transmitted by the first slave device in response to the read command may be received and/or read. Other slave devices coupled to the control data bus may not respond to the read command.

FIG. 17 is a conceptual diagram illustrating an example of a hardware implementation for an apparatus 1700 employing a processing circuit 1702. In this example, the processing circuit 1702 may be implemented with a bus architecture, represented generally by the bus 1716. The bus 1716 may include any number of interconnecting buses and bridges depending on the specific application of the processing circuit 1702 and the overall design constraints. The bus 1716 links together various circuits including one or more processors, represented generally by the processor 1712, line interface circuits 1720 configurable to communicate over connectors or wires 1720, and computer-readable media, represented generally by the processor-readable storage medium 1714. The bus 1716 may also link various other circuits such as timing sources, timers, peripherals, voltage regulators, and power management circuits. A bus interface 1718 provides an interface between the bus 1716, and the line interface circuits 1720. Depending upon the nature of the apparatus, a user interface 1722 (e.g., keypad, display, speaker, microphone, joystick) may also be provided. One or more clock generation circuits or modules may be provided within the processing circuit 1702 or controlled by processing circuit 1702 and/or one or more processors 1712.

The processor 1712 is responsible for managing the bus 1716 and general processing, including the execution of software stored on the processor-readable storage medium 1714. The software, when executed by the processor 1712, causes the processing circuit 1702 to perform the various functions described supra for any particular apparatus. In one example, the software is provided to configure, initiate, control and/or otherwise manage various functions, circuits and modules of the processing circuit 1702. The processor-readable storage medium 1714 may be used for storing data that is manipulated by the processor 1712 when executing software, including data decoded from symbols transmitted over the connectors or wires 1720, including data decoded from signals received on the connectors or wires 1720, which may be configured as data lanes and clock lanes.

In one configuration, the processing circuit 1702 may include modules and/or circuits 1710 for configuring SIDs on a slave device, SID storage and/or maintenance modules and/or circuits 1708, CCIe transmitter modules and/or circuits 1706 for transmitting to individual slave devices or broadcasting to a shared SID, and bus interface modules and/or circuits 1718.

FIG. 18 conceptually illustrates a method 1800 used to operate a CCIe slave device that is responsive to multiple SIDs.

At block 1802, the slave device may respond to a first command transmitted by a bus master on a control data bus when the first command is addressed to a first group slave device identifier. At least one other slave device may be configured to respond to transmissions addressed to the first group slave device identifier. The control data bus may be a CCIe bus, a CCI bus and/or an I2C bus.

At block 1802, the slave device may respond to a second command transmitted by the bus master on the control data bus when the second command is addressed to a unique slave device identifier. Typically, no other slave device is configured to respond to transmissions addressed to a unique slave device identifier.

In one example, the slave device may maintain a plurality of slave device identifiers associated with the slave device in a storage, and refrain from responding to a read or write command received from the control data bus when the read or write command is addressed to a slave device identifier that is not maintained in the storage. The plurality of slave device identifiers maintained in storage may include the unique slave device identifier and the first group slave device identifier.

In another example, the slave device may respond at the slave device to a third command transmitted by the bus master on the control data bus when the third command is addressed to a second group slave device identifier. A first plurality of slave devices may be configured to respond to transmissions addressed to the first group slave device identifier and a second plurality of slave devices may be configured to respond to transmissions addressed to the second group slave device identifier.

In another example, each of the first plurality of slave devices performs a first function, and each of the second plurality of slave devices performs a second function that is different from the first function.

FIG. 19 is a conceptual diagram illustrating an example of a hardware implementation for an apparatus 1900 employing a processing circuit 1902. In this example, the processing circuit 1902 may be implemented with a bus architecture, represented generally by the bus 1916. The bus 1916 may include any number of interconnecting buses and bridges depending on the specific application of the processing circuit 1902 and the overall design constraints. The bus 1916 links together various circuits including one or more processors, represented generally by the processor 1912, line interface circuits 1920 configurable to communicate over connectors or wires 1920, and computer-readable media, represented generally by the processor-readable storage medium 1914. The bus 1916 may also link various other circuits such as timing sources, timers, peripherals, voltage regulators, and power management circuits. A bus interface 1918 provides an interface between the bus 1916, and the line interface circuits 1920. Depending upon the nature of the apparatus, a user interface 1922 (e.g., keypad, display, speaker, microphone, joystick) may also be provided. One or more clock generation circuits or modules may be provided within the processing circuit 1902 or controlled by processing circuit 1902 and/or one or more processors 1912.

The processor 1912 is responsible for managing the bus 1916 and general processing, including the execution of software stored on the processor-readable storage medium 1914. The software, when executed by the processor 1912, causes the processing circuit 1902 to perform the various functions described supra for any particular apparatus. In one example, the software is provided to configure, initiate, control and/or otherwise manage various functions, circuits and modules of the processing circuit 1902. The processor-readable storage medium 1914 may be used for storing data that is manipulated by the processor 1912 when executing software, including data decoded from symbols transmitted over the connectors or wires 1920, including data decoded from signals received on the connectors or wires 1920, which may be configured as data lanes and clock lanes.

In one configuration, the processing circuit 1902 may include modules and/or circuits 1910 for configuring SIDs on the slave device, SID storage and/or maintenance modules, circuits and/or storage devices 1908, CCIe transmitter modules and/or circuits 1906 configured to transmit responses on a CCIe bus, and bus interface modules and/or circuits 1918.

One or more of the components, steps, features, and/or functions illustrated in the Figures may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in the Figures may be configured to perform one or more of the methods, features, or steps described in the Figures. The novel algorithms described herein may also be efficiently implemented in software and/or embedded in hardware.

In addition, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine-readable mediums for storing information. The term "machine readable medium" includes, but is not limited to portable or fixed storage devices, optical storage devices, wireless channels and various other mediums capable of storing, containing, or carrying instruction(s) and/or data.

Furthermore, embodiments may be implemented by hardware, software, firmware, middleware, microcode, or any combination thereof. When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A device, comprising:
a control data bus;
a master device coupled to the control data bus and configured to control access to the control data bus;
a first slave device having a control data bus interface that is assigned a first slave device identifier and a second slave device identifier, wherein the first slave device is adapted to respond to communications transmitted over the control data bus and addressed to the assigned first slave device identifier or the assigned second slave device identifier; and
a second slave device having a control data bus interface that is assigned the first slave device identifier and a third slave device identifier, wherein the second slave device is adapted to respond to communications transmitted over the control data bus and addressed to the assigned first slave device identifier or the assigned third slave device identifier,
wherein each of the first slave device and the second slave device is adapted to respond to communications transmitted over the control data bus and addressed to a common address recognized by all slave devices coupled to the control data bus, the common address being different from the first slave device identifier and the second slave device identifier.

2. The device of claim 1, wherein the control data bus is operated in accordance with a camera control data extension (CCIe) bus protocol.

3. The device of claim 1, wherein the control data bus is operated in accordance with a camera control data (CCI) bus protocol or in accordance with an Inter-Integrated Circuit (I2C) bus protocol.

4. The device of claim 1, wherein the master device is configured to ignore a negative acknowledgement signal that is transmitted by one slave device concurrently with an acknowledgement signal that is transmitted by another slave device.

5. The device of claim 1, wherein the first slave device and the second slave device comprise cameras, and wherein the master device is configured to communicate information concurrently to the first slave device and the second slave device.

6. The device of claim 1, wherein the master device is configured to:
communicate concurrently with the first slave device and the second slave device using the first slave device identifier.

7. The device of claim 1, wherein each of a first group of slave devices coupled to the control data bus responds to communications transmitted over the control data bus and addressed to the first slave device identifier, and
wherein each of a second group of slave devices coupled to the control data bus responds to communications transmitted over the control data bus and addressed to a fourth slave device identifier that is different from the first slave identifier, the second slave identifier, and the third slave identifier.

8. The device of claim 7, wherein each of the first group of slave devices performs a first function, and each of the second group of slave devices performs a second function that is different from the first function.

9. The device of claim 7, wherein the first slave device is further configured with the fourth slave identifier and is a member of the first group of slave devices and the second group of slave devices.

10. A method comprising:
maintaining an address list associating each of a plurality of slave devices coupled to a control data bus with a plurality of assigned slave device identifiers; and
controlling access to the control data bus based on the address list, wherein controlling access to the control data bus includes:
in a first mode of operating the control data bus, communicating concurrently with a first slave device and a second slave device using a first group slave device identifier that is assigned to the first slave device and the second slave device; and
in a second mode of operating the control data bus, communicating individually with the first slave device using a unique slave device identifier that is assigned to the first slave device and is not assigned to the second slave device,
wherein both the first slave device and the second slave device include a control data bus interface adapted to respond to communications transmitted over the control data bus and addressed to the first group identifier, respective unique slave device identifiers, and a common slave device identifier recognized by all slave devices coupled to the control data bus, the common slave device identifier being different from the first group identifier and the unique slave device identifier.

11. The method of claim 10, further comprising:
broadcasting a first write message concurrently to a first plurality of slave devices using the first group slave device identifier; and
broadcasting a second write message concurrently to a second plurality of slave devices using a second group slave device identifier.

12. The method of claim 10, further comprising:
addressing a read command to the first slave device using the unique slave device identifier; and
reading data transmitted by the first slave device in response to the read command, wherein other slave devices coupled to the control data bus do not respond to the read command.

13. The method of claim 10, wherein the control data bus comprises a camera control data (CCI) bus or an Inter-Integrated Circuit (I2C) bus.

14. The method of claim 10, wherein the first slave device and the second slave device comprise cameras.

15. A method, comprising:
responding at a slave device to a first command transmitted by a bus master coupled to a control data bus when the first command is addressed to a first group slave device identifier, wherein the first group slave device identifier is assigned to a control data bus interface of the slave device and to at least one other slave device;
responding at the slave device to a second command transmitted by the bus master coupled to the control data bus when the second command is addressed to a unique slave device identifier, wherein the unique slave device identifier is assigned to the control data bus interface of the slave device and to no other slave device; and
responding at the slave device to a third command transmitted by the bus master coupled to the control data bus when the third command is addressed to a common slave device identifier recognized by all slave devices coupled to the control data bus, the common slave device identifier being different from the first group slave device identifier and the unique slave device identifier.

16. The method of claim 15, wherein the control data bus is operated in accordance with camera control data (CCI) bus protocols or Inter-Integrated Circuit (I2C) bus protocols.

17. The method of claim 15, further comprising:
maintaining in storage, a plurality of assigned slave device identifiers that were assigned to the control data bus interface of the slave device, wherein the plurality of assigned slave device identifiers includes the unique slave device identifier and the first group slave device identifier; and
refraining from responding to a read or write command received from the control data bus when the read or write command is addressed to a slave device identifier that is not maintained in the storage.

18. The method of claim 15, further comprising:
responding at the slave device to a third command transmitted by the bus master coupled to the control data bus when the third command is addressed to a second group slave device identifier, wherein the second group slave device identifier is assigned to the control data bus interface of the slave device and to one or more other slave devices,
wherein a first plurality of slave devices is configured to respond to transmissions addressed to the first group slave device identifier and a second plurality of slave devices is configured to respond to transmissions addressed to the second group slave device identifier.

19. The method of claim 18, wherein each of the first plurality of slave devices performs a first function, and each of the second plurality of slave devices performs a second function that is different from the first function.

20. A slave device, comprising:
a control data bus interface adapted to couple the slave device to a control data bus shared with other devices; and
a processing circuit coupled to the control data bus interface and configured to respond to messages addressed using a first slave device identifier that is uniquely associated with the control data bus interface and to messages addressed to a second slave device identifier that is associated with the control data bus interface and to at least one other slave device, wherein the processing circuit is further configured to respond to messages addressed using a common slave device identifier recognized by all slave devices coupled to the control data bus, the common slave device identifier being different from the first slave device identifier and the second slave device identifier.

21. The slave device of claim 20, wherein the processing circuit is configured to:

transmit information on the control data bus in response to a command addressed using the first slave device identifier and received from the control data bus.

22. The slave device of claim 20, wherein the processing circuit is configured to:

respond to a first command received from the control data bus when the first command is addressed using the first slave device identifier; and respond to a second command received from the control data bus when the second command is addressed using the second slave device identifier.

23. The slave device of claim 22, further comprising:

responding to a third command received from the control data bus when the third command is addressed using a third slave device identifier, wherein a first plurality of slave devices is configured to respond to transmissions addressed to the second slave device identifier and a second plurality of slave devices is configured to respond to transmissions addressed to the third slave device identifier.

24. The slave device of claim 23, wherein each of the first plurality of slave devices performs a first function, and each of the second plurality of slave devices performs a second function that is different from the first function.

25. The slave device of claim 20, further comprising:

a camera, wherein the control data bus is operated in accordance with camera control data (CCI) bus protocols.

26. The slave device of claim 20, further comprising:

a camera, wherein the control data bus is operated in accordance with Inter-Integrated Circuit (I2C) bus protocols.

27. The slave device of claim 20, further comprising:

storage configured to maintain the first slave device identifier and the second slave device identifier.

28. The device of claim 1, wherein, the first slave device identifier serves to identify only a subset of all available slave devices coupled to the control data bus.

29. The device of claim 1, wherein the first slave device identifier is stored in an assigned slave identifier listing that identifies slave devices that respond to multiple slave device identifiers.

30. The device of claim 29, wherein the assigned slave identifier listing is transferred from an active master node to an inactive master node during, before, or after initiating a handover of a master role on the control data bus.

* * * * *